US009724647B2

(12) United States Patent
Hosoya et al.

(10) Patent No.: US 9,724,647 B2
(45) Date of Patent: Aug. 8, 2017

(54) ACIDIC GAS SEPARATION MODULE, ACIDIC GAS SEPARATION DEVICE, AND TELESCOPE PREVENTION PLATE

(71) Applicant: FUJIFILM CORPORATION, Minato-ku, Tokyo (JP)

(72) Inventors: Yoichi Hosoya, Kanagawa (JP); Kenichi Ishizuka, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 275 days.

(21) Appl. No.: 14/644,212

(22) Filed: Mar. 11, 2015

(65) Prior Publication Data
US 2015/0182917 A1    Jul. 2, 2015

Related U.S. Application Data

(63) Continuation of application No. PCT/JP2013/073709, filed on Sep. 3, 2013.

(30) Foreign Application Priority Data

Sep. 28, 2012  (JP) .................................. 2012-217831
Sep. 28, 2012  (JP) .................................. 2012-217833
Mar. 25, 2013  (JP) .................................. 2013-062657

(51) Int. Cl.
*B01D 53/22*  (2006.01)
*B01D 63/10*  (2006.01)
(Continued)

(52) U.S. Cl.
CPC ......... *B01D 63/106* (2013.01); *B01D 53/226* (2013.01); *B01D 53/228* (2013.01);
(Continued)

(58) Field of Classification Search
CPC ................ B01D 63/10; B01D 2325/30; B01D 2257/504; B01D 53/228; B01D 63/106;
(Continued)

(56) References Cited

U.S. PATENT DOCUMENTS 2,213,433 A * 9/1940 Punton .................. A62B 23/00
                                                            128/206.17
4,296,951 A * 10/1981 Zimmerly .............. B01D 63/12
                                                            285/123.16
(Continued)

FOREIGN PATENT DOCUMENTS

JP    2005-111473 A     4/2005
JP    2007-517661 A     7/2007
(Continued)

OTHER PUBLICATIONS

Chinese Office action dated Dec. 2, 2015, with the partial English translation corresponding to the instant patent application.

*Primary Examiner* — Anthony Shumate
(74) *Attorney, Agent, or Firm* — Solaris Intellectual Property Group, PLLC

(57) ABSTRACT

An acidic gas separation module 10, which improves gas separation efficiency and reduces pressure loss, includes: a permeating gas collecting tube 12 having tube walls in which through holes 12A are formed; a layered body 14 that has at least an acidic gas separation layer 32 and that is wound on the permeating gas collecting tube 12; and telescope prevention plates 18 (a gas supply side 18A and a gas discharge side 18B) provided at both end faces in an axial direction of the wound layered body 14, wherein the ratio (D2/D1) of the open area ratio D2 of the telescope prevention plate on the gas discharge side 18B relative to the open area ratio D1 of the telescope prevention plate on the gas supply side 18A is from 0.5 to 0.9. An acidic gas separation device includes the acidic gas separation module 10.

32 Claims, 12 Drawing Sheets

(51) Int. Cl.
*B01D 63/12* (2006.01)
*B01D 69/02* (2006.01)

(52) U.S. Cl.
CPC .............. *B01D 63/10* (2013.01); *B01D 63/12* (2013.01); *B01D 69/02* (2013.01); *B01D 2053/223* (2013.01); *B01D 2257/504* (2013.01); *B01D 2313/08* (2013.01); *B01D 2319/02* (2013.01); *B01D 2325/30* (2013.01); *Y02C 10/10* (2013.01); *Y10T 428/214* (2015.01)

(58) Field of Classification Search
CPC ............ B01D 2319/02; B01D 2313/08; B01D 53/226; B01D 69/02; B01D 2053/223; B01D 63/12; Y02C 10/10; Y10T 428/214
See application file for complete search history.

(56) References Cited

U.S. PATENT DOCUMENTS

| | | | | |
|---|---|---|---|---|
| 4,517,085 A * | 5/1985 | Driscoll | ................ | B01D 29/17 210/232 |
| 5,312,547 A * | 5/1994 | Kruger | .................... | A61M 1/28 210/317 |
| 5,783,083 A * | 7/1998 | Henshaw | ............... | B01D 61/18 210/257.2 |
| 8,236,177 B1 * | 8/2012 | Wood | .................... | B01D 63/10 210/321.6 |
| 2004/0026310 A1 * | 2/2004 | Larsen | ................... | B01D 63/10 210/323.1 |
| 2005/0035047 A1 * | 2/2005 | Colby | .................... | B01D 63/10 210/321.74 |
| 2006/0243653 A1 * | 11/2006 | Heinrich | ............. | B01D 61/243 210/321.79 |
| 2010/0282676 A1 * | 11/2010 | Liberman | ............. | B01D 63/12 210/636 |
| 2010/0326910 A1 * | 12/2010 | Van Der Padt | ........ | B01D 63/10 210/637 |
| 2011/0042294 A1 * | 2/2011 | Bonta | .................. | B01D 29/073 210/232 |
| 2011/0053043 A1 * | 3/2011 | Balsara | .................. | B01D 69/02 429/493 |
| 2011/0079546 A1 * | 4/2011 | Konishi | ............... | B01D 61/025 210/87 |
| 2012/0234746 A1 * | 9/2012 | Howard | .................. | B01D 63/02 210/321.89 |
| 2014/0183126 A1 * | 7/2014 | Chikura | ............... | B01D 63/12 210/454 |
| 2014/0231332 A1 * | 8/2014 | Hirozawa | .............. | B01D 63/10 210/321.83 |
| 2014/0353239 A1 * | 12/2014 | Lesan | .................. | B01D 63/106 210/335 |
| 2015/0060359 A1 * | 3/2015 | Wang | ..................... | B01D 63/10 210/636 |
| 2015/0144559 A1 * | 5/2015 | Taniguchi | ............ | B01D 63/106 210/650 |
| 2015/0144560 A1 * | 5/2015 | Taniguchi | ............. | B01D 63/12 210/650 |
| 2016/0207003 A1 * | 7/2016 | Nishioka | ............. | B01D 63/106 |

FOREIGN PATENT DOCUMENTS

| | | |
|---|---|---|
| JP | 2009-189947 A | 8/2009 |
| JP | 2010-42374 A | 2/2010 |

* cited by examiner

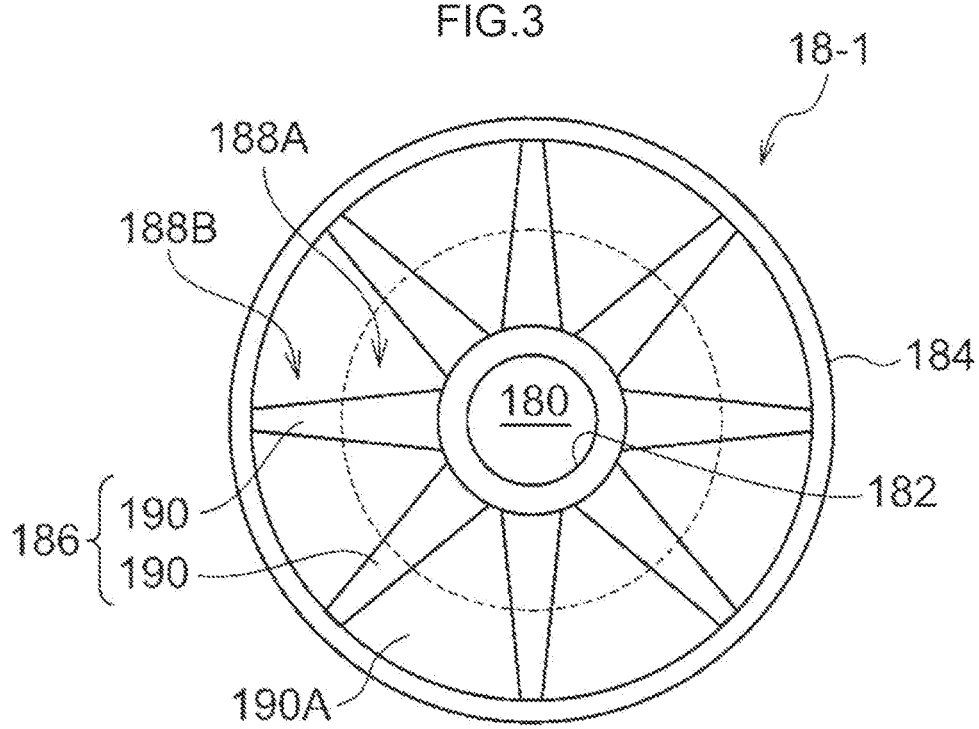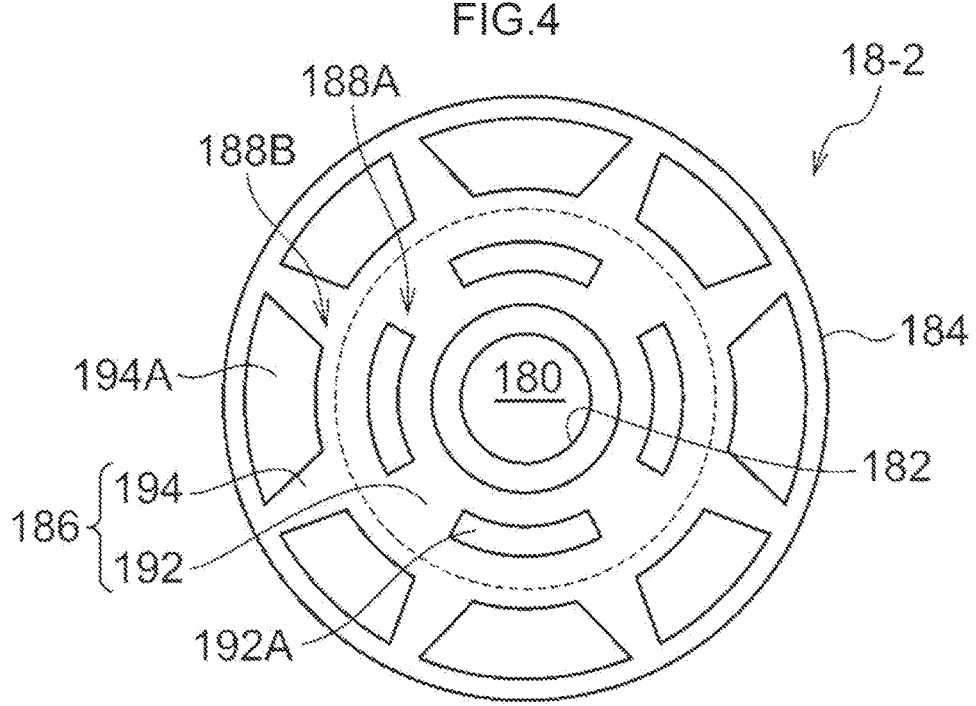

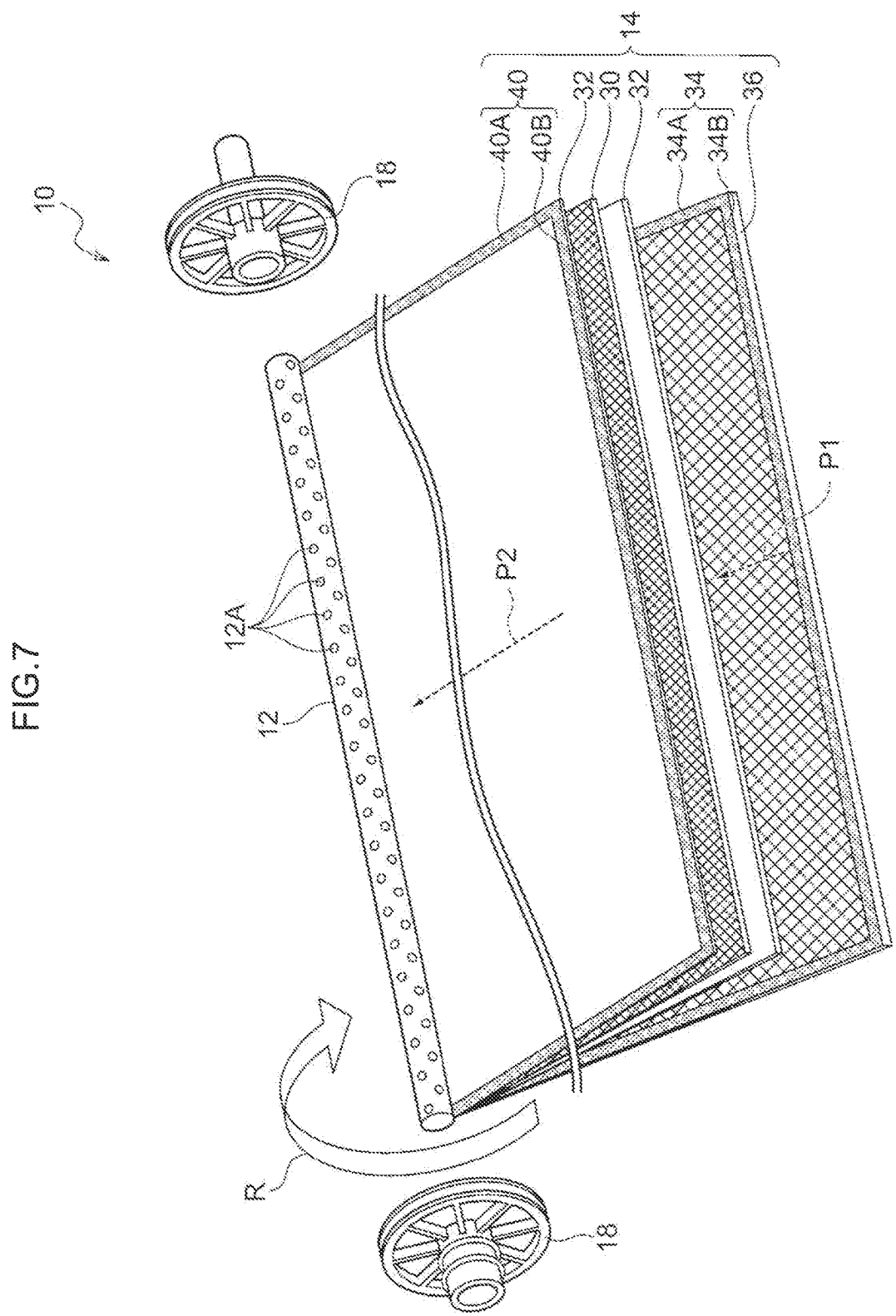

ACIDIC GAS SEPARATION MODULE, ACIDIC GAS SEPARATION DEVICE, AND TELESCOPE PREVENTION PLATE

CROSS-REFERENCE TO RELATED APPLICATION

This application is a Continuation of PCT International Application No. PCT/JP2013/073709, filed Sep. 3, 2013, which claims priority under 35 U.S.C. §119(a) to Japanese Patent Application Nos. 2012-217831 filed Sep. 28, 2012, 2012-217833 filed Sep. 28, 2012, and 2013-062657 filed Mar. 25, 2013. Each of the above applications is hereby expressly incorporated by reference, in its entirety, into the present application.

BACKGROUND OF THE INVENTION

Technical Field

The present invention relates to an acidic gas separation module, an acidic gas separation device, and a telescope prevention plate.

Background Art

In recent years, development of techniques for selectively separating acidic gases in a source gas has been progressing. For example, an acidic gas separation module that separates acidic gases from a source gas by using an acidic gas separation layer which selectively permeates acidic gases, has been developed.

For example, telescope prevention plates are provided at both end faces in an axial direction of the acidic gas separation module.

Regarding the telescope prevention plate, a configuration including an inner peripheral annular part, an outer peripheral annular part, and several spoke parts that connect these annular parts with each other in all directions, and a configuration in which a plurality of round-shaped openings are provided in a disk, are known (see, for example, Japanese Patent Application Laid-Open (JP-A) Nos. 2010-42374 and 2009-189947, Japanese National Phase Publication No. 2007-517661, and JP-A No. 2005-111473).

SUMMARY OF INVENTION

Technical Problem

Incidentally, acidic gas separation modules are configured such that a source gas is supplied from one end face side, and the acidic gas that has been separated is discharged from a gas collecting tube provided at a central part. Accordingly, in present circumstances, the source gas easily flows to an inner side region near the gas collecting tube, and the outer side region is in a state that is less likely to contribute to the separation of acidic gas, whereby the separation efficiency is low.

Further, in present circumstances, when telescope prevention plates are provided at both end faces in an axial direction of an acidic gas separation module, these telescope prevention plates may constitute flow path resistance, and pressure loss may occur in the flowing source gas.

Therefore, an aspect of the invention is to provide an acidic gas separation module that improves gas separation efficiency and reduces pressure loss, and an acidic gas separation device.

Another aspect of the invention is to provide a telescope prevention plate that improves the gas separation efficiency of an acidic gas separation module and reduces pressure loss.

Solution to Problem

The above problems of the invention are solved by the following means.

<1> An acidic gas separation module including:
a permeating gas collecting tube having tube walls in which through holes are formed;
a layered body that has at least an acidic gas separation layer and that is wound onto the permeating gas collecting tube; and
telescope prevention plates provided at both end faces in an axial direction of the wound layered body,
wherein a ratio (D2/D1) of an open area ratio D2 of a telescope prevention plate on a gas discharge side relative to an open area ratio D1 of a telescope prevention plate on a gas supply side is from 0.5 to 0.9.

<2> The acidic gas separation module according to the item <1>, wherein the layered body is a layered body formed by layering: a supply gas flow channel member, to which a source gas including an acidic gas is supplied; the acidic gas separation layer, which includes a carrier, that reacts with the acidic gas in the source gas that passes through the supply gas flow channel member, and a hydrophilic compound that carries the carrier; and a permeating gas flow channel member, through which the acidic gas that has reacted with the carrier and has permeated through the acidic gas separation layer flows toward the through holes.

<3> The acidic gas separation module according to the item <2>, wherein the acidic gas separation layer has an accelerated transport membrane that includes the carrier and the hydrophilic compound, which has a crosslinking structure, and a porous support that supports the accelerated transport membrane.

<4> The acidic gas separation module according to the item <2> or the item <3>, wherein: the acidic gas separation module is equipped with a bonding portion that bonds end portions in a circumferential direction of the acidic gas separation layer and the permeating gas flow channel member, by bonding both side end portions of the acidic gas separation layer and the permeating gas flow channel member along the circumferential direction, in a state in which the through holes are covered with the permeating gas flow channel member, and the layered body is wound in multiple layers on the permeating gas collecting tube;
the permeating gas collecting tube has a discharge port which is provided at one end portion of the tube and through which the acidic gas that has been collected from the through holes is discharged, a supply port which is provided at the other end portion of the tube and to which a sweep gas is supplied, and a blocking member which is provided between the discharge port and the supply port and which blocks an interior part of the tube;
a partition bonding portion is formed along the circumferential direction, between circumferential direction bonding portions of the bonding portion that are bonded along the circumferential direction, and on an outer peripheral side of the blocking member; and
the partition bonding portion is not in contact with an axial direction bonding portion of the bonding portion, which bonds the end portions in the circumferential direction, has a narrower width than the circumferential direction bonding portions, and forms a flow path, through which the sweep gas flows, between the circumferential direction bonding portions and the axial direction bonding portion.

<5> The acidic gas separation module according to any one of the items <1> to <4>, wherein at least one of the telescope prevention plates is equipped with an inner peripheral annular part that forms a central opening, an outer peripheral annular part that is provided at an outer side of the inner peripheral annular part, and a connecting part that connects the inner peripheral annular part and the outer peripheral annular part, and when a planar area excluding the central opening is divided into two regions by a dividing line concentric to the periphery of the outer peripheral annular part such that respective areas of the regions are equal, a ratio (S1/S2) of an open area ratio S1 of a region on the inner peripheral annular part side relative to an open area ratio S2 of a region on the outer peripheral annular part side is from 0.2 to 0.8.

<6> An acidic gas separation device comprising the acidic gas separation module according to any one of the items <1> to <5>, and a pressure container in which the acidic gas separation module is loaded.

<7> The acidic gas separation device according to the item <6>, wherein a plurality of acidic gas separation modules are loaded in the pressure container in a state of being connected in series, and at least one of the plurality of acidic gas separation modules is the acidic gas separation module according to any one of the items <1> to <5>.

<8> An acidic gas separation device including:
a plurality of acidic gas separation modules, each having a permeating gas collecting tube having tube walls in which through holes are formed, a layered body that has at least an acidic gas separation layer and that is wound on the permeating gas collecting tube, and telescope prevention plates that are provided at both end faces in an axial direction of the wound layered body; and
a pressure container in which the plurality of acidic gas separation modules are loaded in a state of being connected in series,
wherein, among the plurality of acidic gas separation modules, in an acidic gas separation module that is connected in series as an n-th module, where n is an integer of 2 or more, from the gas supply side, when a ratio (D2$n$/D1$n$) of an open area ratio D2$n$ of a telescope prevention plate on a gas discharge side relative to an open area ratio D1$n$ of a telescope prevention plate on a gas supply side is represented by $\Delta(n)$, a relationship of $\Delta(n-1) > \Delta(n)$ is satisfied.

<9> The acidic gas separation device according to the item <8>, wherein at least one of the plurality of acidic gas separation modules is an acidic gas separation module in which a ratio (D2/D1) of an open area ratio D2 of the telescope prevention plate on the gas discharge side relative to the open area ratio D1 of the telescope prevention plate on the gas supply side is from 0.5 to 0.9.

<10> The acidic gas separation device according to the item <8> or the item <9>, wherein the layered body is a layered body formed by layering: a supply gas flow channel member, to which a source gas including an acidic gas is supplied; the acidic gas separation layer, which includes a carrier that reacts with the acidic gas in the source gas that passes through the supply gas flow channel member, and a hydrophilic compound that carries the carrier; and a permeating gas flow channel member, through which the acidic gas that has reacted with the carrier and has permeated through the acidic gas separation layer flows toward the through holes.

<11> The acidic gas separation device according to any one of the items <8> to <10>, wherein the acidic gas separation layer has an accelerated transport membrane that includes the carrier and the hydrophilic compound, which has a crosslinking structure, and a porous support that supports the accelerated transport membrane.

<12> The acidic gas separation device according to the item <10> or the item <11>, wherein
the acidic gas separation module is equipped with a bonding portion that bonds the end portions in a circumferential direction of the acidic gas separation layer and the permeating gas flow channel member, by bonding both side end portions of the acidic gas separation layer and the permeating gas flow channel member along the circumferential direction, in a state in which the through holes are covered with the permeating gas flow channel member, and the layered body is wound in multiple layers on the permeating gas collecting tube,
the permeating gas collecting tube has a discharge port which is provided at one end portion of the tube and through which the acidic gas that has been collected from the through holes is discharged, a supply port which is provided at the other end portion of the tube and to which a sweep gas is supplied, and a blocking member which is provided between the discharge port and the supply port and which blocks an interior part of the tube;
a partition bonding portion is formed along the circumferential direction, between circumferential direction bonding portions of the bonding portion that are bonded along the circumferential direction, and on an outer peripheral side of the blocking member; and
the partition bonding portion is not in contact with an axial direction bonding portion of the bonding portion, which bonds the end portions in the circumferential direction, has a narrower width than the circumferential direction bonding portions, and forms a flow path, through which the sweep gas flows, between the circumferential direction bonding portions and the axial direction bonding portion.

<13> The acidic gas separation device according to any one of the items <8> to <12>, wherein at least one of the telescope prevention plates is equipped with an inner peripheral annular part that forms a central opening, an outer peripheral annular part that is provided on an outer side of the inner peripheral annular part, and a connecting part that connects the inner peripheral annular part and the outer peripheral annular part, and when a planar area excluding the central opening is divided into two regions by a dividing line concentric to the periphery of the outer peripheral annular part such that respective areas of the regions are equal, a ratio (S1/S2) of an open area ratio S1 of a region on the inner peripheral annular part side relative to an open area ratio S2 of a region on the outer peripheral annular part side is from 0.2 to 0.8.

<14> A telescope prevention plate including:
an inner peripheral annular part that forms a central opening;
an outer peripheral annular part provided on an outer side of the inner peripheral annular part; and
a connecting part that connects the inner peripheral annular part and the outer peripheral annular part,
wherein, when a planar area excluding the central opening is divided into two regions by a dividing line concentric to the periphery of the outer peripheral annular part such that respective areas of the regions are equal, a ratio (S1/S2) of an open area ratio S1 of a region on the inner peripheral annular part side relative to an open area ratio S2 of a region on the outer peripheral annular part side is from 0.2 to 0.8.

<15> The telescope prevention plate according to the item <14>, wherein the connecting part includes a plurality of spoke parts that connect the inner peripheral annular part and the outer peripheral annular part in a radial pattern, in which a width of a spoke part at the outer peripheral annular part side is smaller than a width of a spoke part at the inner peripheral annular part side.

<16> The telescope prevention plate according to the item <14>, wherein the connecting part includes a plate-like part concentrically extended from the inner peripheral annular part toward an outer side, the plate-like part being provided with a plurality of openings and with spoke parts that connect the plate-like part and the outer peripheral annular part in a radial pattern.

<17> The telescope prevention plate according to the item <14>, wherein the connecting part includes a plate-like part that connects the inner peripheral annular part and the outer peripheral annular part, the plate-like part having a plurality of first openings, which are formed in the region on the inner peripheral annular part side, and a plurality of second openings which are formed in the region on the outer peripheral annular part side, such that an opening area of the second openings is larger than an opening area of the first openings and/or the number of the second openings is larger than the number of the first openings.

<18> An acidic gas separation module including:

a permeating gas collecting tube having tube walls in which through holes are formed;

a layered body that has at least an acidic gas separation layer and that is wound on the permeating gas collecting tube; and the telescope prevention plates according to any one of the items <14> to <17>, the telescope prevention plates being provided at both end faces in an axial direction of the wound layered body.

<19> The acidic gas separation module according to the item <18>, wherein the layered body is a layered body formed by layering: a supply gas flow channel member, to which a source gas including an acidic gas is supplied; the acidic gas separation layer, which includes a carrier that reacts with the acidic gas in the source gas that passes through the supply gas flow channel member, and a hydrophilic compound that carries the carrier; and a permeating gas flow channel member, through which the acidic gas, that has reacted with the carrier and has permeated through the acidic gas separation layer, flows toward the through holes.

<20> The acidic gas separation module according to the item <19>, wherein the acidic gas separation layer has an accelerated transport membrane that includes the carrier and the hydrophilic compound, which has a crosslinking structure, and a porous support that supports the accelerated transport membrane.

<21> The acidic gas separation module according to the item <19> or the item <20>, wherein the acidic gas separation module is equipped with a bonding portion that bonds end portions in a circumferential direction of the acidic gas separation layer and the permeating gas flow channel member, by bonding both side end portions of the acidic gas separation layer and the permeating gas flow channel member along the circumferential direction in a state in which the through holes are covered with the permeating gas flow channel member, and the layered body is wound in multiple layers on the permeating gas collecting tube;

the permeating gas collecting tube has: a discharge port which is provided at one end portion of the tube and through which the acidic gas that has been collected from the through holes is discharged; a supply port which is provided at the other end portion of the tube and to which a sweep gas is supplied; and a blocking member which is provided between the discharge port and the supply port and which blocks an interior part of the tube;

a partition bonding portion is formed along the circumferential direction, between circumferential direction bonding portions of the bonding portion that are bonded along the circumferential direction, and on an outer peripheral side of the blocking member; and the partition bonding portion is not in contact with an axial direction bonding portion of the bonding portion, which bonds the end portions in the circumferential direction, has a narrower width than the circumferential direction bonding portions, and forms a flow path, through which the sweep gas flows, between the circumferential direction bonding portions and the axial direction bonding portion.

<22> An acidic gas separation device comprising the acidic gas separation module according to any one of the items <18> to <21>, and a pressure container in which the acidic gas separation module is loaded.

<23> The acidic gas separation device according to the item <22>, wherein a plurality of acidic gas separation modules are loaded in the pressure container in a state of being connected in series, and at least one of the plurality of acidic gas separation modules is the acidic gas separation module according to any one of the items <18> to <21>.

Advantageous Effects of Invention

According to the invention, an acidic gas separation module, which improves gas separation efficiency and reduces pressure loss, and an acidic gas separation device can be provided.

Further, according to the invention, a telescope prevention plate, which improves the gas separation efficiency of an acidic gas separation module and reduces pressure loss, can be provided.

BRIEF DESCRIPTION OF DRAWINGS

FIG. 3 is a plan view schematically showing a first variation example of the telescope prevention plates shown in FIG. 2A and FIG. 2B.

FIG. 4 is a plan view schematically showing a second variation example of the telescope prevention plates shown in FIG. 2A and FIG. 2B.

FIG. 7 is a diagram showing the state before winding the layered body on the permeating gas collecting tube in the acidic gas separation module of the invention, and is a diagram representing one exemplary embodiment of the formation regions of the respective bonding portions.

DESCRIPTION OF EMBODIMENTS

Hereinafter, the telescope prevention plate, acidic gas separation module, and acidic gas separation device according to the exemplary embodiments of the invention are specifically explained with reference to the accompanying drawings. In the figures, there are cases in which the same symbol is attached to the member (constituent element) having the same or corresponding function, and explanation is omitted, if appropriate.

<Acidic Gas Separation Module>

Figure 1:
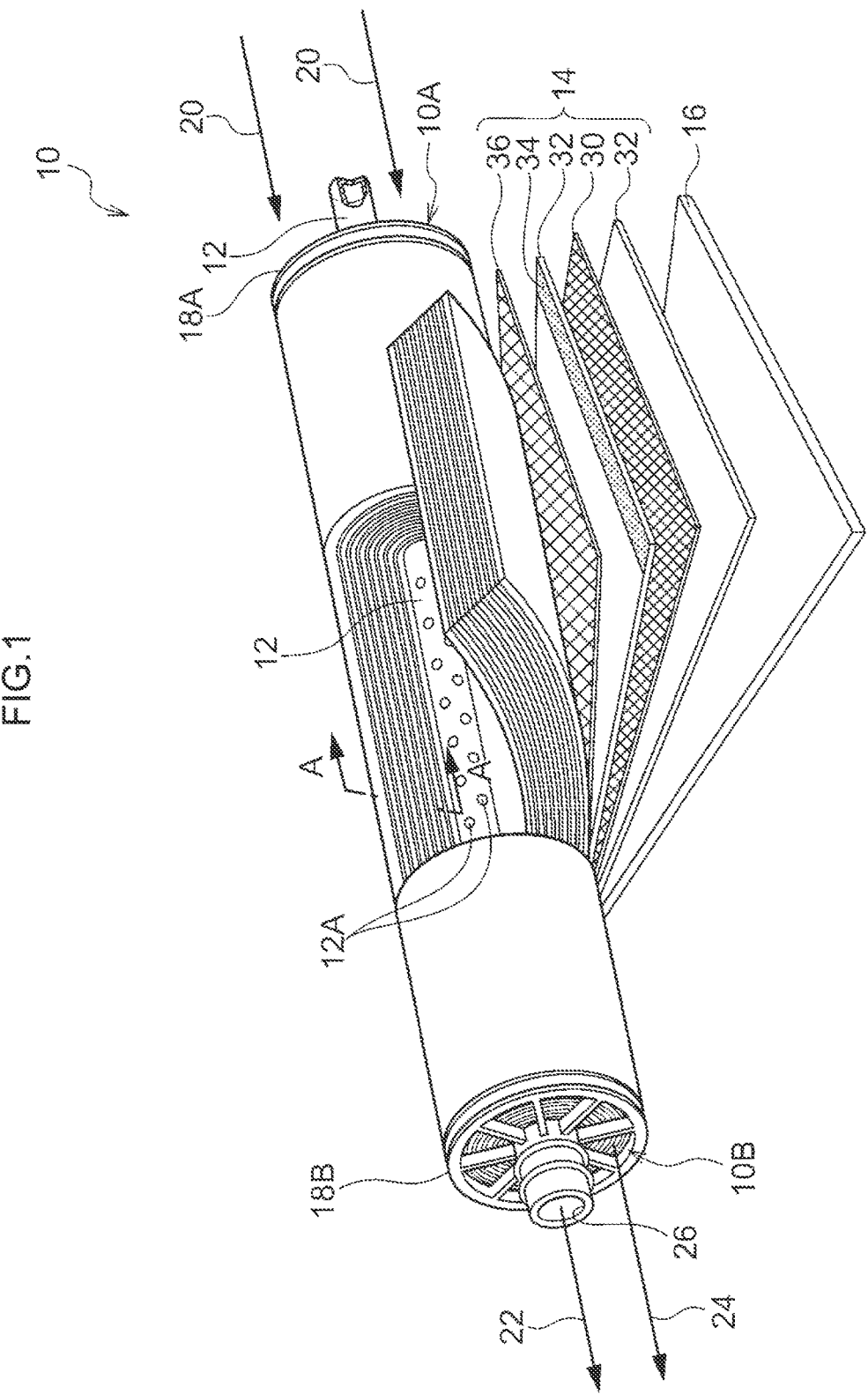
FIG. 1 is a schematic diagram showing one exemplary embodiment of an acidic gas separation module of the invention.

FIG. 1 is a schematic diagram showing one exemplary embodiment of an acidic gas separation module of the invention. Note that, FIG. 1 indicates a view with partial cutaway.

As shown in FIG. 1, the acidic gas separation module 10 according to the exemplary embodiment of the invention is equipped with a permeating gas collecting tube 12 with tube walls in which through holes 12A are formed; a layered body 14 that has at least an acidic gas separation layer 32, the layered body 14 being wound on the permeating gas collecting tube 12; and telescope prevention plates 18 (the telescope prevention plate on the gas supply side is represented by 18A, and the telescope prevention plate on the gas discharge side is represented by 18B) provided at both end faces in an axial direction of the wound layered body 14.

Further, the ratio (D2/D1; hereinafter referred to as "D2/D1 ratio") of the open area ratio D2 of the telescope prevention plate 18B on the gas discharge side (hereinafter referred to as "gas discharge side open area ratio D2") relative to the open area ratio D1 of the telescope prevention plate 18A on the gas supply side (hereinafter referred to as "gas supply side open area ratio D1") is from 0.5 to 0.9.

Note that, the "open area ratio of the telescope prevention plate 18" indicates the proportion of the area of the opening region relative to the area of the region that is surrounded by the outer periphery of the telescope prevention plate 18, when the telescope prevention plate 18 is planarly viewed (when viewed from the thickness direction of the prevention plate; hereinafter the same applies).

In the acidic gas separation module 10, the D2/D1 ratio being within the above range means the state in which the gas discharge side open area ratio D2 is smaller than the gas supply side open area ratio D1.

When the gas discharge side open area ratio D2 is made smaller than the gas supply side open area ratio D1 (when the D2/D1 ratio is 0.9 or lower), the back pressure at the gas discharge side of the acidic gas separation module becomes higher and, as a result, also in an outer peripheral side region of the acidic gas separation module, a state in which flowing of source gas is facilitated can be formed, and contribution of the outer periphery side region to the separation of acidic gas can be realized.

However, when the gas discharge side open area ratio D2 is made excessively smaller than the gas supply side open area ratio D1 (when the D2/D1 ratio is lower than 0.5), the flow path resistance increases, and the pressure loss of the flowing source gas rises.

Therefore, in the acidic gas separation module 10, by adjusting the D2/D1 ratio to fall within the above range, the gas separation efficiency can be improved and the pressure loss can be reduced.

In the acidic gas separation module 10, the D2/D1 ratio is from 0.5 to 0.9, but from the viewpoints of improvement in gas separation efficiency and reduction in pressure loss, the D2/D1 ratio is preferably from 0.5 to 0.85, and more preferably from 0.55 to 0.8.

Further, from the same viewpoints, the gas supply side open area ratio D1 is preferably from 50% to 95%, more preferably from 60% to 90%, and still more preferably from 70% to 85%.

Moreover, from the same viewpoints, the gas discharge side open area ratio D2 is preferably from 5% to 90%, more preferably from 10% to 80%, and still more preferably from 20% to 70%.

The open area ratio is determined by calculating, from the drawing, the area of the transmitting portion obtained when the telescope prevention plate is projected. Regarding the calculation method, a method of inputting the data into a computer and performing graphic data processing may be adopted, or a method of projecting the telescope prevention plate on a piece of cardboard to make a model of the plate, then cutting out the transmitting portion, and measuring the weight may be adopted.

Hereinafter, the acidic gas separation module 10 is described in detail.

Specifically, the acidic gas separation module 10 is configured, as the fundamental structure, such that the outermost periphery of a layered body 14 is covered with a covering layer 16, in the state in which one or a plurality of layered bodies 14 are wound around a permeating gas collecting tube 12, and telescope prevention plates 18 are each mounted to the two ends of these units, respectively.

In the acidic gas separation module 10 having such a configuration, when a source gas 20 including an acidic gas is supplied to the layered body 14 from the side of one end portion 10A thereof, according to the configuration of the layered body 14 described below, the source gas 20 is separated into an acidic gas 22 and a residual gas 24, and the gases are separately discharged to the side of the other end portion 10B.

(Telescope Prevention Plate)

Figure 2A:
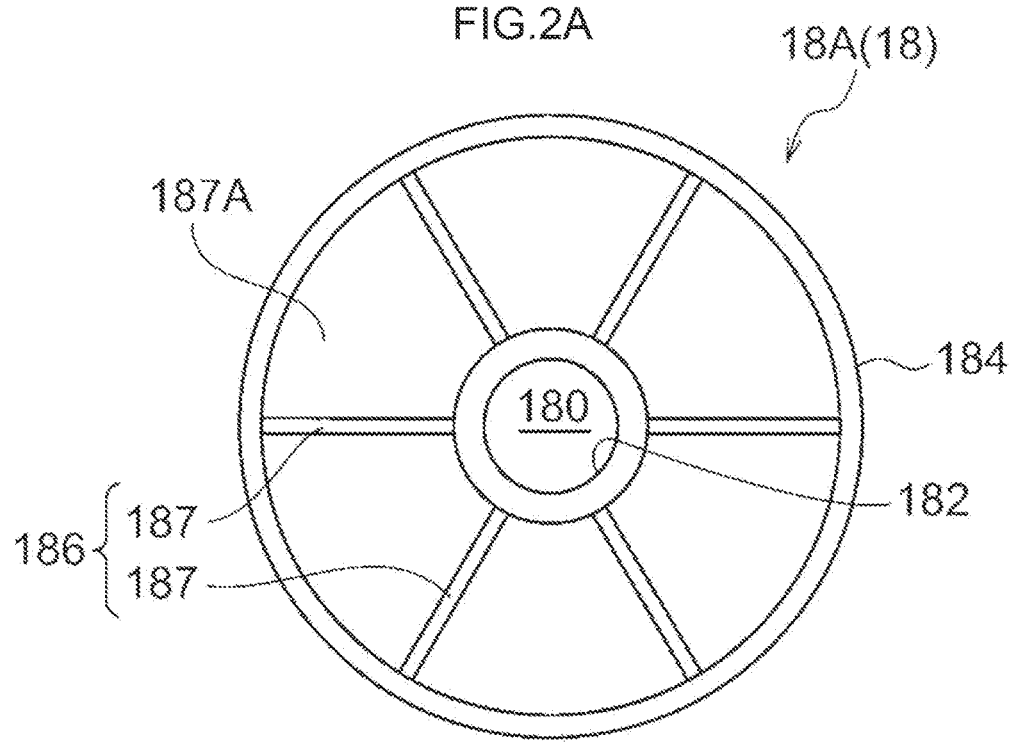
FIG. 2A is a plan view schematically showing one exemplary embodiment of a telescope prevention plate on the gas supply side.
Figure 2B:
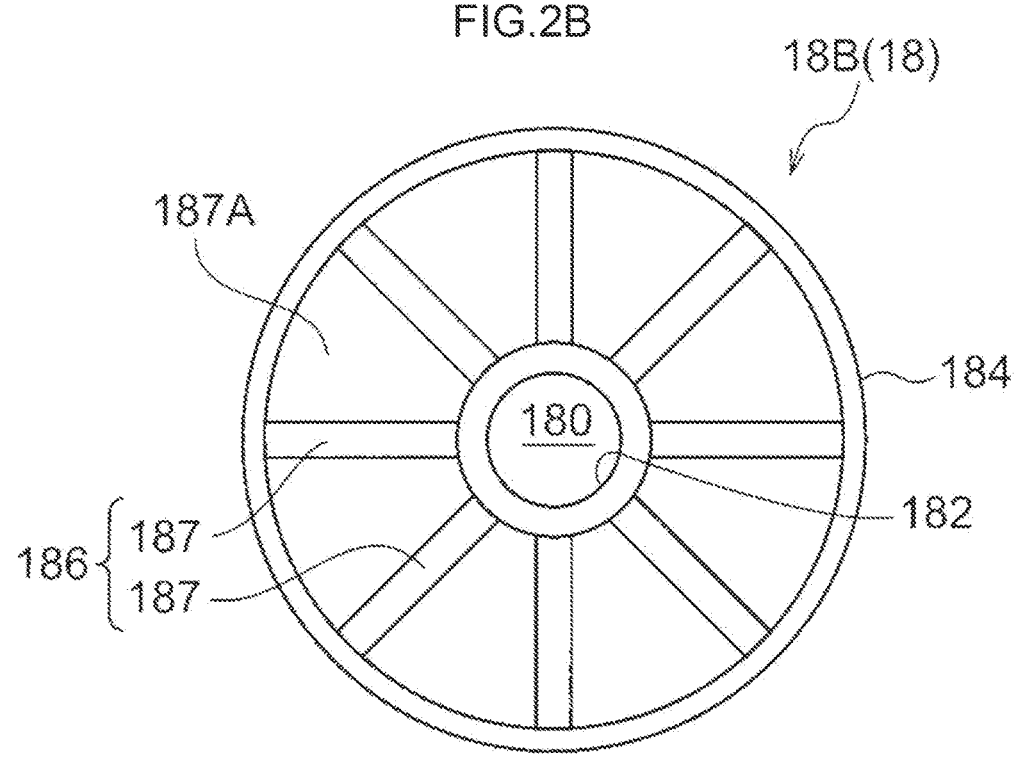
FIG. 2B is a plan view schematically showing one exemplary embodiment of a telescope prevention plate on the gas discharge side.

FIG. 2A is a plan view schematically showing one exemplary embodiment of a telescope prevention plate on the gas supply side. FIG. 2B is a plan view schematically showing one exemplary embodiment of a telescope prevention plate on the gas discharge side.

The telescope prevention plates 18 (18A and 18B) are provided at both end faces in the axial direction of the acidic gas separation module 10, and are, for example, members for suppressing the telescope phenomenon [a phenomenon of extending telescopically (like a telescope)] of an acidic gas separation module (specifically, a layered body which is wound up and has a gas separation layer).

As shown in FIG. 2 (FIG. 2A and FIG. 2B), the telescope prevention plates 18 (18A and 18B) are each equipped with an inner peripheral annular part 182 that forms a central opening 180, an outer peripheral annular part 184 which is provided on the outer side of the inner peripheral annular part 182, and a connecting part 186 that connects the inner peripheral annular part 182 and the outer peripheral annular part 184.

Specifically, the telescope prevention plate 18 is configured to include a round-shaped inner peripheral annular part 182, an outer peripheral annular part 184 which is provided coaxially with the inner peripheral annular part 182 and has a larger outward form than that of the inner peripheral annular part 182, and a connecting part 186 which includes a plurality of spoke parts 187 that connect the inner peripheral annular part 182 and the outer peripheral annular part 184 in a radial pattern. The planar shape of the telescope prevention plate is a round shape.

The telescope prevention plate 18 has a round-shaped central opening 180, which is surrounded by the round-shaped inner peripheral annular part 182, and openings 187A, each of which is surrounded by the inner peripheral annular part 182, the outer peripheral annular part 184, and the spoke parts 187.

The telescope prevention plate 18 is provided on the acidic gas separation module, in the state in which the permeating gas collecting tube 12 is fitted in the central opening 180 which is surrounded by the round-shaped inner peripheral annular part 182.

Note that, the shape of the telescope prevention plate 18 is not limited to a disk-like shape, and the shape is selected according to the shape of the acidic gas separation module.

The inner peripheral annular part 182 is configured to have a cylindrical shape, so as to protrude with respect to the outer peripheral annular part 184 in the axial direction. The inner peripheral annular part 182 is configured to have a cylindrical shape, so as to protrude with respect to the outer peripheral annular part 184 in the axial direction of the telescope prevention plate 18. On the other hand, the outer peripheral annular part 184 is configured to have a ring-like shape. However, the telescope prevention plate 18 may be configured to have a disk-like shape in which the thickness of the inner peripheral annular part 182 is the same as the thickness of the outer peripheral annular part 184.

The spoke part 187 has an identical width from the inner peripheral annular part 182 side to the outer peripheral annular part 184 side.

Here, since the open area ratio of the telescope prevention plate 18A on the gas supply side and the open area ratio of the telescope prevention plate 18B on the gas discharge side are different from each other, at least one of the number or the width of the spoke parts 187, which serve as the connecting part 186, is different.

Specifically, as shown in FIG. 2A and FIG. 2B, in order to satisfy the D2/D1 ratio described above, the telescope prevention plate 18B on the gas discharge side has a larger number of spoke parts 187 and also the width of the spoke part is broader, as compared with the telescope prevention plate 18A on the gas supply side.

Examples of the material of the telescope prevention plate 18 include metal materials (for example, SUS, alminium, aluminium alloy, tin, tin alloy, or the like), resin materials (for example, a polyethylene resin, a polypropylene resin, an aromatic polyamide resin, nylon 12, nylon 66, a polysulfone resin, a polytetrafluoroethylene resin, a polycarbonate resin, an acryl/butadiene/styrene resin, an acryl/ethylene/styrene resin, an epoxy resin, a nitrile resin, a polyether ether ketone resin (PEEK), a polyacetal resin (POM), a polyphenylene sulfide (PPS), or the like), fiber-reinforced plastics of these resins (examples of fiber include glass fiber, carbon fiber, stainless steel fiber, and aramid fiber; and particularly, long fiber is preferable; specific examples include long glass fiber reinforced polypropylene and long glass fiber reinforced polyphenylene sulfide), and ceramics (for example, zeolite, alumina, or the like).

Above all, the material of the telescope prevention plate 18 is preferably a material having wet heat resistance.

Note that, in the exemplary embodiment of the invention, unless otherwise specifically stated, the "heat resistance" in the "wet heat resistance" means to have resistance to heat of 80° C. or higher. Specifically, "resistance to heat of 80° C. or higher" means that, even after storage for two hours under the temperature condition of 80° C. or higher, the form before the storage is maintained, and curl due to heat shrinkage or heat fusion, which can be visually confirmed, does not occur. Further, in the exemplary embodiment of the invention, the "wet resistance" in the "wet heat resistance" means that, even after storage for two hours under the conditions of 40° C. and 80% RH, the form before the storage is maintained, and curl due to moisture absorption or the like, which can be visually confirmed, does not occur.

—Variation Examples—

The telescope prevention plate 18 is not limited to the above configuration, and may have another form.

Specifically, as the telescope prevention plate 18, a substance may be applied, in which, when a planar area excluding the central opening 180 is divided into two regions to be parted by a dividing line (indicated by a dotted line in FIG. 3 to FIG. 5) that is concentric to the periphery of the outer peripheral annular part 184, such that respective areas of the regions are equal, the ratio (S1/S2; hereinafter referred to as "S1/S2 ratio") of the open area ratio S1 (hereinafter referred to as "inner periphery side open area ratio S1") of the region on the inner peripheral annular part 182 side (hereinafter referred to as "inner periphery side region 188A") relative to the open area ratio S2 (hereinafter referred to as "outer periphery side open area ratio S2") of the region on the outer peripheral annular part 184 side (hereinafter referred to as "outer periphery side region 188B") is from 0.2 to 0.8 (see, FIG. 3 to FIG. 5).

In the telescope prevention plate 18, the S1/S2 ratio being within the above range means the state in which the outer periphery side open area ratio S2 is greater than the inner periphery side open area ratio S1.

In a case in which the outer periphery side open area ratio S2 is made greater with respect to the inner periphery side open area ratio S1 (in a case in which the S1/S2 ratio is 0.8 or lower), when a telescope prevention plate 18 is provided at an axial direction end face of the acidic gas separation module on the source gas supply side, it is possible to form a state in which, within the region surrounded by the inner peripheral annular part 182 and the outer peripheral annular part 184, the source gas that is supplied to the acidic gas separation module hardly flows into the inner periphery side region 188A, but easily flows into the outer periphery side region 188B. Further, when a telescope prevention plate 18 is provided at an axial direction end face of the acidic gas separation module on the gas discharge side, it is possible to form a state in which, within the region surrounded by the inner peripheral annular part 182 and the outer peripheral annular part 184, the back pressure of the residual gas after acidic gas separation gets higher in the inner periphery side region 188A, but the back pressure gets lower in the outer periphery side region 188B.

Namely, when the outer periphery side open area ratio S2 is made greater with respect to the inner periphery side open area ratio S1, also in the outer periphery side region 188B of the acidic gas separation module, it is possible to form a state in which flowing of source gas is facilitated, and contribution of the outer periphery side region to the separation of acidic gas can be realized.

However, when the outer periphery side open area ratio S2 is made excessively greater with respect to the inner periphery side open area ratio S1 (when the S1/S2 ratio is lower than 0.2), the inner periphery side open area ratio S1 excessively becomes too small, and thus, the flow path resistance increases, and the pressure loss of the flowing source gas rises.

Therefore, in the telescope prevention plate 18, by adjusting the S1/S2 ratio to fall within the above range, the gas separation efficiency of the acidic gas separation module can be improved and the pressure loss can be reduced.

In the telescope prevention plate 18, the S1/S2 ratio is from 0.2 to 0.8, but from the viewpoints of improvement in gas separation efficiency of the acidic gas separation module and reduction in pressure loss, the S1/S2 ratio is preferably from 0.3 to 0.75, and more preferably from 0.5 to 0.7.

Further, from the same viewpoints, the inner periphery side open area ratio S1 is preferably from 10% to 90%, more preferably from 20% to 80%, and still more preferably from 30% to 70%.

Moreover, from the same viewpoints, the outer periphery side open area ratio S2 is preferably from 50% to 95%, more preferably from 60% to 90%, and still more preferably from 70% to 85%.

The method of measuring these open area ratios is the same as the method of measuring the gas supply side open area ratio D1.

Here, the "a planar area excluding the central opening 180" indicates the region which is surrounded by the inner periphery of the inner peripheral annular part 182 and the outer periphery of the outer peripheral annular part 184, when the telescope prevention plate 18 is planarly viewed. That is, the planar area indicates the region surrounded by the edge of the central opening 180 and the outer periphery of the telescope prevention plate 18.

The expression "a planar area excluding the central opening 180 is divided into two regions to be parted by a dividing line (indicated by a dotted line in FIG. 3 to FIG. 5) that is concentric to the periphery of the outer peripheral annular part 184 such that respective areas of the regions are equal" indicates that, when the telescope prevention plate 18 is planarly viewed, the region surrounded by the inner periphery of the inner peripheral annular part 182 and the outer periphery of the outer peripheral annular part 184 is divided to be parted by a concentric dividing line, such that the area of the region surrounded by the concentric dividing line and the inner periphery of the inner peripheral annular part 182, and the area of the region surrounded by the concentric dividing line and the outer periphery of the outer peripheral annular part 184 are equal to each other. The two regions obtained by the division are the inner periphery side region 188A and the outer periphery side region 188B.

The "inner periphery side open area ratio S1" indicates the proportion of the area of the opening region in the inner periphery side region relative to the area of the inner periphery side region 188A, when the telescope prevention plate 18 is planarly viewed.

The "outer periphery side open area ratio S2" indicates the proportion of the area of the opening region in the outer periphery side region relative to the area of the outer periphery side region 188B, when the telescope prevention plate 18 is planarly viewed.

The S1/S2 ratio of telescope prevention plate 18 is not disclosed in any of JP-A Nos. 2010-42374, 2009-189947, 2007-517661, and 2005-111473. Further, for example, in the telescope prevention plate including spoke parts having an identical width (see FIG. 2A and FIG. 2B), which is disclosed in JP-A No. 2010-42374, when an open area ratio, which realizes supply of a source gas necessary for allowing the acidic gas separation module to work, is ensured, it is impossible to adjust the S1/S2 ratio to fall within the above range. In addition, with regard to the telescope prevention plates disclosed in JP-A No. 2009-189947, the S1/S2 ratios are examined and revealed to be 0.92 in the shape of FIG. 1, 1.1 in the shape of FIG. 3, 0.96 in the shape of FIG. 4, 0.92 in the shape of FIGS. 5, and 0.97 in the shape of FIG. 6 (the figure numbers are all the figure numbers shown in JP-A No. 2009-189947).

In the following, the telescope prevention plate 18 that satisfies the above S1/S2 ratio is described in more detail.

—First Variation Example—

FIG. 3 is a plan view schematically showing a first variation example of the telescope prevention plates shown in FIG. 2A and FIG. 2B.

As shown in FIG. 3, the telescope prevention plate 18-1 according to the first variation example is equipped with a connecting part 186 formed of a plurality of spoke parts 190, in which the width of the spoke part at the outer peripheral annular part 184 side is smaller than the width of the spoke part at the inner peripheral annular part 182 side. The telescope prevention plate 18 has openings 190A, each of which is surrounded by the inner peripheral annular part 182, the outer peripheral annular part 184, and the spoke parts 190.

Specifically, the spoke part 190 is made such that the width gradually gets smaller, from the inner peripheral annular part 182 toward the outer peripheral annular part 184. Note that, the spoke part 190 may be made such that the width gets smaller, step by step, from the inner peripheral annular part 182 toward the outer peripheral annular part 184.

In the telescope prevention plate 18-1, the number and width of the spoke parts 190 are selected according to the aimed S1/S2 ratio, inner periphery side open area ratio S1, and outer periphery side open area ratio S2. Namely, the S1/S2 ratio, the inner periphery side open area ratio S1, and the outer periphery side open area ratio S2 can be adjusted by the number and width of the spoke parts 190.

With the configuration in which the telescope prevention plate 18-1 is equipped with a connecting part 186 formed of the plurality of spoke parts 190, the width of the spoke part at the outer peripheral annular part 184 side being smaller than the width of the spoke part at the inner peripheral annular part 182 side, the inner periphery side open area ratio S1 is decreased and the outer periphery side open area ratio S2 is increased, and thus, the S1/S2 ratio is easily adjusted to fall within the above range.

—Second Variation Example—

FIG. 4 is a plan view schematically showing a second variation example of the telescope prevention plates shown in FIG. 2A and FIG. 2B.

As shown in FIG. 4, the telescope prevention plate 18-2 according to the second variation example is equipped with a connecting part 186 having a plate-like part 192 that is concentrically extended from the inner peripheral annular part 182 toward the outer side, the plate-like part 192 being provided with a plurality of openings 192A, and a plurality of spoke parts 194 that connect the plate-like part 192 and the outer peripheral annular part 184 in a radial pattern.

The telescope prevention plate 18-2 has openings 194A, each of which is surrounded by the plate-like part 192, the outer peripheral annular part 184, and the spoke parts 194.

Specifically, the plate-like part 192 is formed to be concentrically extended from the entire periphery of the inner peripheral annular part 182 toward the outer side, so as to cover the inner periphery side region 188A.

The openings 192A in the plate-like part 192 have a shape in which the size along the circumferential direction is extended from the inner periphery part to the outer periphery part, and are arranged in a row in the circumferential direction.

The arrangement of the openings 192A in the plate-like part 192 is not limited to the arrangement in a row, and the openings may be arranged in a plurality of rows alternately.

The opening shape of the openings 192A in the plate-like part 192 is not limited to the above shape, and may be a polygonal shape such a rectangular shape, or may be a round shape.

The spoke part 194 is formed such that the width at the outer peripheral annular part 184 side is smaller than the width at the inner peripheral annular part 182 side.

Specifically, the spoke part 194 is made such that the width gets smaller, gradually, from the inner peripheral annular part 182 toward the outer peripheral annular part 184. The spoke part 194 may be made such that the width gets smaller, step by step, from the inner peripheral annular part 182 toward the outer peripheral annular part 184. Alternatively, the spoke part 194 may be made such that the width at the inner peripheral annular part 182 side is the same as the width at the outer peripheral annular part 184 side.

In the telescope prevention plate 18-2, the number, size, shape, and arrangement position of the openings 192A in the plate-like part 192, and the number and width of the spoke parts 194 are selected according to the aimed S1/S2 ratio, inner periphery side open area ratio S1, and outer periphery side open area ratio S2. Namely, the S1/S2 ratio, the inner periphery side open area ratio S1, and the outer periphery side open area ratio S2 can be adjusted by the number, size, shape, and arrangement position of the openings 192A in the plate-like part 192, and the number and width of the spoke parts 194.

With the configuration in which the telescope prevention plate 18-2 is equipped with a connecting part 186 having a plate-like part 192 provided with the plurality of openings 192A and spoke parts 194 which connect the plate-like part 192 and the outer peripheral annular part 184 in a radial pattern, the inner periphery side open area ratio S1 is decreased and the outer periphery side open area ratio S2 is increased, and thus, the S1/S2 ratio is easily adjusted to fall within the above range.

—Third Variation Example—

Figure 5:
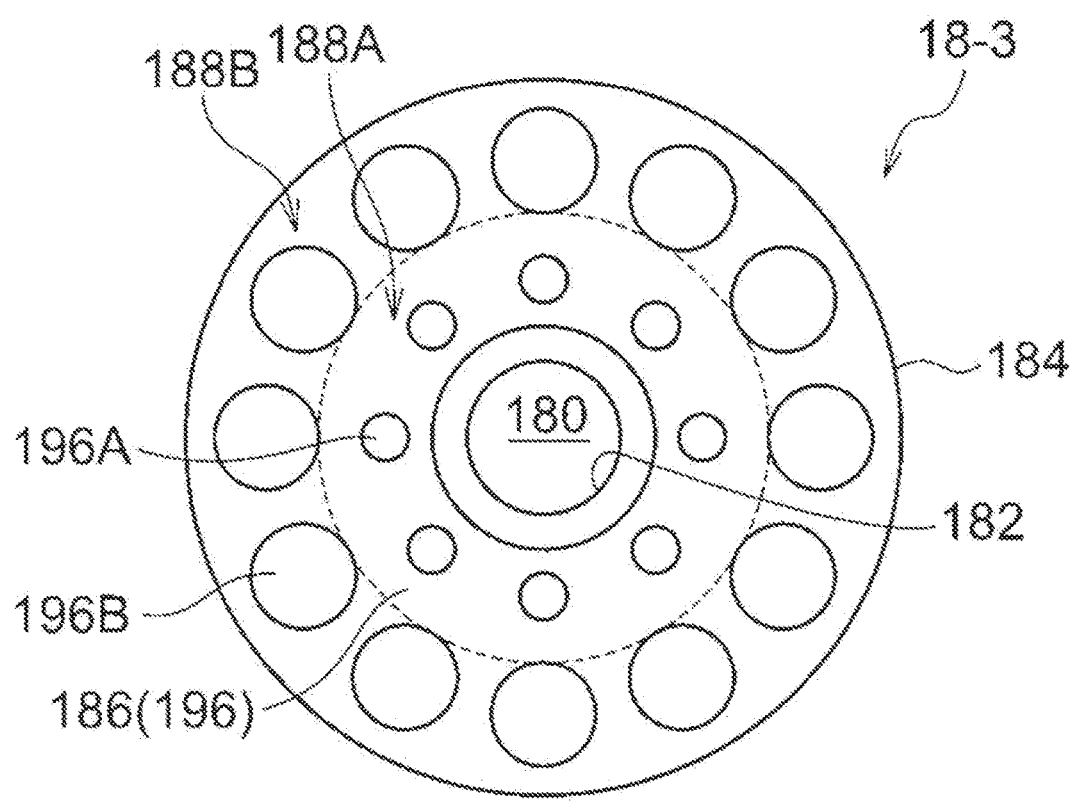
FIG. 5 is a plan view schematically showing a third variation example of the telescope prevention plates shown in FIG. 2A and FIG. 2B.

FIG. 5 is a plan view schematically showing a third variation example of telescope prevention plate.

As shown in FIG. 5, the telescope prevention plate 18-3 according to the third variation example is equipped with a connecting part 186 formed of a plate-like part 196 that connects the inner peripheral annular part 182 and the outer peripheral annular part 184.

The plate-like part 196 has a plurality of first openings 196A which are provided in the inner periphery side region 188A and second openings 196B which are provided in the outer periphery side region 188B, such that the opening area of the second opening is larger than the opening area of the first opening and the number of the second openings is larger than the number of the first openings 196A. Namely, the second openings 196B are provided in the outer periphery side region 188B, such that the opening area of the second opening is larger than the opening area of the first opening and the number of the second openings is greater than the number of the first openings 196A.

Here, the opening area indicates the area of the opening region, when the telescope prevention plate 18-3 is planarly viewed.

Note that, the plate-like part 196 may have a plurality of second openings 196B that are provided in the outer periphery side region 188B, such that the opening area of the second opening is larger than the opening area of the first opening or the number of the second openings is larger than the number of the first openings 196A.

Specifically, the plate-like part 196 connects the entire outer periphery of the inner peripheral annular part 182 and the entire inner periphery of the outer peripheral annular part 184, such that the plate-like part has a disk-like shape, in which the central part where the inner peripheral annular part 180 positions is hollowed out roundly.

In the plate-like part 196, the first openings 196A have a round shape, and are arranged in a row in the circumferential direction. Further, the second openings 196B also have a round shape, and are arranged in a row in the circumferential direction.

The arrangement of the first openings 196A or the second openings 196B is not limited to the arrangement in a row, and they may be arranged in a plurality of rows alternately.

The opening shape of the first openings 196A and the second openings 196B is not limited to the round shape, and may be a polygonal shape such as a rectangular shape, or may be a shape in which the size along the circumferential direction is extended from the inner periphery part to the outer periphery part (see the openings 192A shown in FIG. 4).

In the telescope prevention plate 18-3, the number, size, shape, and arrangement position of the first openings 196A and the second openings 196B are selected according to the aimed S1/S2 ratio, inner periphery side open area ratio S1, and outer periphery side open area ratio S2. Namely, the S1/S2 ratio, the inner periphery side open area ratio S1, and the outer periphery side open area ratio S2 can be adjusted by the number, size, shape, and arrangement position of the first openings 196A and second openings 196B.

With the configuration in which the telescope prevention plate 18-3 is equipped with a connecting part 186 formed of a plate-like part 196 having the plurality of first openings 196A, which are formed in the inner periphery side region 188A, and second openings 196B, which are formed in the outer periphery side region 188B such that the opening area of the second opening is larger than the opening area of the first opening and/or the number of the second openings is larger than the number of the first openings, the inner periphery side open area ratio S1 is decreased and the outer periphery side open area ratio S2 is increased, and thus, the S1/S2 ratio is easily adjusted to fall within the above range.

(Permeating Gas Collecting Tube)

A permeating gas collecting tube 12 is a cylindrical tube having tube walls in which a plurality of through holes 12A are formed. In the permeating gas collecting tube 12, the side of one end portion of the tube (one end portion 10A side) is closed, and the side of the other end portion of the tube (the other end portion 10B side) is open and serves as a discharge port 26, from which acidic gas 22, such as carbon dioxide or the like, that has permeated through the layered body 14 and has been collected from the through holes 12A is discharged.

In the region which is sealed with the adhesive agent described below, the proportion (open area ratio) of the through holes 12A to the surface area of the permeating gas collecting tube 12 is preferably from 1.5% to 80%, more preferably from 3% to 75%, and still more preferably from 5% to 70%. Further, from a practical point of view, the open area ratio is preferably from 5% to 25%.

When the open area ratio is equal to or more than the lower limit, the acidic gas 22 can be efficiently collected. Further, when the open area ratio is equal to or less than the upper limit, the strength of the tube can be enhanced and processing suitability can be sufficiently ensured.

The shape of the through hole 12A is not particularly limited, but it is preferable that the permeating gas collecting tube has round holes having a diameter of from 0.5 mm to 20 mm. Further, it is preferable that the through holes 12A are uniformly arranged with respect to the surface of the permeating gas collecting tube 12.

(Covering Layer)

The covering layer 16 is formed from a blocking material capable of blocking the source gas 20 the passes through the acidic gas separation module 10. It is preferable that the blocking material has wet heat resistance. Note that, in the exemplary embodiment of the invention, unless otherwise specifically stated, the "heat resistance" in the "wet heat resistance" means to have resistance to heat of 80° C. or higher. Specifically, "resistance to heat of 80° C. or higher" means that, even after storage for two hours under the temperature condition of 80° C. or higher, the form before the storage is maintained, and curl due to heat shrinkage or heat fusion, which can be visually confirmed, does not occur. Further, in the exemplary embodiment of the invention, the "wet resistance" in the "wet heat resistance" means that, even after storage for two hours under the conditions of 40° C. and 80% RH, the form before the storage is maintained, and curl due to moisture absorption or the like, which can be visually confirmed, does not occur.

(Layered Body)

The layered body 14 is configured such that the supply gas flow channel member 30 is sandwiched between the acidic gas separation layer 32, which has been folded in two in such a manner that the accelerated transport membrane described below is on the inward side, and at the radial direction inner side thereof, the acidic gas separation layer 32 is bonded to the supply gas flow channel member 36 via the bonding portion 34 which has penetrated thereto.

The number of sheets of the layered body 14 wound on the permeating gas collecting tube 12 is not particularly limited, and may be one or plural. However, by increasing the number of sheets (the lamination number), the membrane area of the accelerated transport membrane 32A can be increased. Accordingly, the amount of acidic gas 22 that one module can separate can be increased. In order to increase the membrane area, the length of the layered body 14 may be further lengthened.

In a case in which the number of sheets of the layered body 14 is plural, the number of sheets is preferably 50 or less, more preferably 45 or less, and still more preferably 40 or less. When the number of sheets is within this range, it is easy to wind up the layered body 14, and processing suitability is enhanced.

The width of the layered body 14 is not particularly limited, but is preferably from 50 mm to 10,000 mm, more preferably from 60 mm to 9,000 mm, and still more preferably from 70 mm to 8,000 mm. Further, from a practical point of view, the width of the layered body 14 is preferably from 200 mm to 2,000 mm.

When the width is equal to or more than the lower limit, even if coating (sealing) of an adhesive agent is performed, an effective membrane area of the accelerated transport membrane 32A can be ensured. Further, when the width is equal to or less than the upper limit, the horizontality of the winding core can be maintained and generation of deviation in winding can be suppressed.

Figure 6:
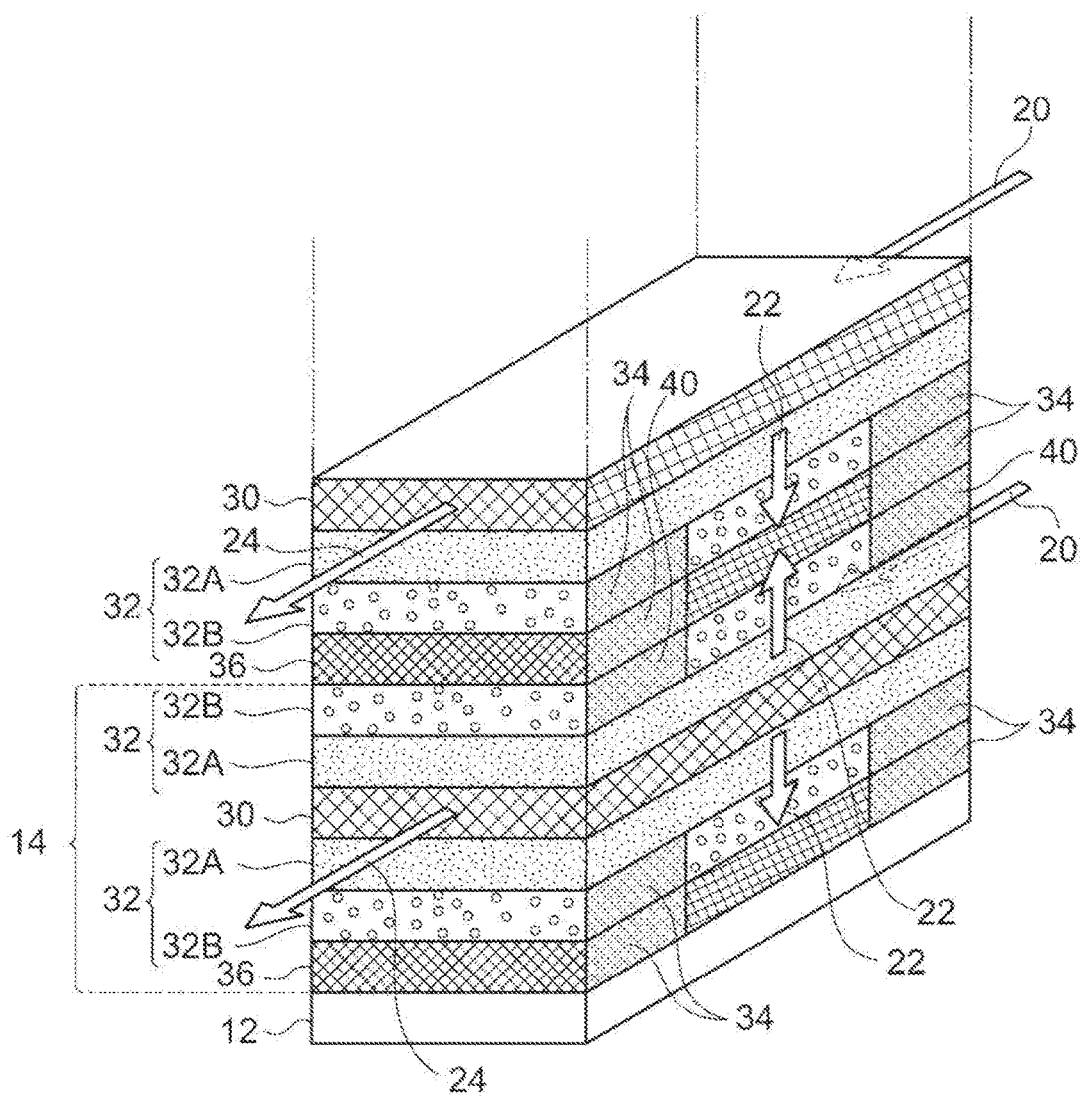
FIG. 6 is a cross sectional view with respect to the arrows A to A in FIG. 1, and is a diagram showing the laminate structure of the layered body.

FIG. 6 is a cross sectional view with respect to the arrows A to A in FIG. 1, and is a diagram showing the laminate structure of the layered body.

As shown in FIG. 6, the layered bodies 14 are bonded to each other via the bonding portion 40 that has penetrated into the acidic gas separation layer 32, and are piled up around the permeating gas collecting tube 12.

Specifically, the layered body 14 is formed by layering the permeating gas flow channel member 36, the acidic gas separation layer 32, the supply gas flow channel member 30, and the acidic gas separation layer 32, in this order from the permeating gas collecting tube 12 side.

With the above lamination, the source gas 20 including the acidic gas 22 is supplied from the end portion of the supply gas flow channel member 30, permeates through the acidic gas separation layer 32 according to the exemplary embodiment of the invention, which is divided by the covering layer 16 (shown in FIG. 1, but not shown in FIG. 6), then the separated acidic gas 22 is accumulated in the permeating gas collecting tube 12 through the permeating gas flow channel member 36 and the through holes 12A, and collected from the discharge port 26 that is connected to the permeating gas collecting tube 12. Further, in the acidic gas separation module 10, the residual gas 24, which has passed through the voids of the supply gas flow channel member 30 or the like and is separated from the acidic gas 22, is discharged from the end portion of the supply gas flow channel member 30 or acidic gas separation layer 32, on the side where the discharge port 26 is formed.

(Supply Gas Flow Channel Member)

The supply gas flow channel member 30 is a member, to which the source gas 20 including the acidic gas 22 is supplied from one end portion 10A side of the acidic gas separation module 10, and since it is preferable to have a function as a spacer and to allow the source gas 20 to generate turbulent flow, a net-shaped member is preferably used. Since the flow path of the gas changes according to the shape of the net, the shape of the unit lattice of the net is selected from, for example, a diamond shape, a parallelogram shape, and the like, according to the purpose, and used. Further, assuming that a source gas 20 containing steam at high temperature is supplied, it is preferable that the supply gas flow channel member 30 has wet heat resistance, similar to the acidic gas separation layer 32 described below.

The material of the supply gas flow channel member 30 is by no means limited, and examples include paper, high quality paper, coated paper, cast coated paper, synthetic paper, cellulose, resin materials such as polyester, polyolefin, polyamide, polyimide, polysulfone, aramid, or polycarbonate, and inorganic materials such as metals, glass, or ceramics. Preferable examples of the resin materials include polyethylene, polystyrene, polyethylene terephthalate, polytetrafluoroethylene (PTFE), polyether sulfone (PES), polyphenylene sulfide (PPS), polysulfone (PSF), polypropylene (PP), polyimide, polyether imide, polyether ether ketone, and polyvinylidene fluoride.

Further, from the viewpoint of wet heat resistance, preferable examples of the material include inorganic materials such as ceramics, glass, or metals, and organic resin materials having resistance to heat of 100° C. or higher. A high molecular weight polyester, polyolefin, a heat-resistant polyamide, polyimide, polysulfone, aramid, polycarbonate, a metal, glass, ceramics, or the like can be preferably used. More specifically, it is preferable to include at least one material selected from the group consisting of ceramics, polytetrafluoroethylene, polyvinylidene fluoride, polyether sulfone, polyphenylene sulfide, polysulfone, polyimide, polypropylene, polyether imide, and polyether ether ketone.

The thickness of the supply gas flow channel member 30 is not particularly limited, but is preferably from 100 μm to 1,000 μm, more preferably from 150 μm to 950 μm, and still more preferably from 200 μm to 900 μm.

(Acidic Gas Separation Layer)

The acidic gas separation layer 32 has an accelerated transport membrane 32A, which is provided on the supply gas flow channel member 30 side, and a porous support 32B which is provided on the permeating gas flow channel member 36 side and supports the accelerated transport membrane 32A.

(Accelerated Transport Membrane)

The accelerated transport membrane 32A includes at least a carrier that reacts with the acidic gas 22 in the source gas 20 that passes through the supply gas flow channel member 30, and a hydrophilic compound that carries the carrier, and has a function of allowing the acidic gas 22 to permeate selectively from the source gas 20. In the exemplary embodiment of the invention, since the accelerated transport membrane 32A has a higher heat resistance than that of a generally used dissolution-diffusion membrane, for example, even under the temperature condition of from 100° C. to 200° C., the accelerated transport membrane can allow the acidic gas 22 to permeate selectively. Further, even when steam is included in the source gas 20, the hydrophilic compound absorbs the steam, and the accelerated transport membrane 32A that includes the hydrophilic compound retains moisture, and thus, the carrier is transported more easily. As a result, the separation efficiency is enhanced as compared with the case of using a dissolution-diffusion membrane.

The membrane area of the accelerated transport membrane 32A is not particularly limited, but is preferably from 0.01 m² to 1,000 m², more preferably from 0.02 m² to 750 m², and still more preferably from 0.025 m² to 500 m². From a practical point of view, the membrane area is preferably from 1 m² to 100 m².

When the membrane area is equal to or more than the lower limit, the acidic gas 22 can be separated efficiently with respect to the membrane area. Further, when the membrane area is equal to or less than the upper limit, the processing property is facilitated.

The length of the accelerated transport membrane 32A (the total length before folded in two) is not particularly limited, but is preferably from 100 mm to 10,000 mm, more preferably from 150 mm to 9,000 mm, and still more preferably from 200 mm to 8,000 mm. Further, from a practical point of view, the length is preferably from 800 mm to 4,000 mm.

When the length is equal to or more than the lower limit, the acidic gas 22 can be separated efficiently with respect to the membrane area. Further, when the length is equal to or less than the upper limit, the generation of deviation in winding is suppressed and the processing property is facilitated.

Further, regarding the accelerated transport membrane 32A, from the viewpoint of heat resistance, it is preferable that the accelerated transport membrane 32A including the hydrophilic compound has a crosslinking structure. From such a viewpoint, the accelerated transport membrane is explained with reference to preferable forms.

For example, the accelerated transport membrane 32A is composed of a hydrophilic compound layer having a crosslinking structure including a hydrolysis resistant bond selected from the following group (B), which is formed by using a single crosslinkable group or a plurality of crosslinkable groups selected from the following group (A). Particularly, from the viewpoint of having excellent acidic gas separation characteristics and excellent durability, it is preferable that the accelerated transport membrane 32A is composed of a hydrophilic compound layer having a crosslinking structure including a hydrolysis resistant bond selected from the following group (B), which is formed by using a single crosslinkable group selected from the following group (A).

Group (A): —OH, —NH$_2$, —Cl, —CN, —COOH, an epoxy group

Group (B): an ether bond, an acetal bond, —NH—CH$_2$—C(OH)—, —O-M-O— (M represents Ti or Zr), —NH-M-O— (M represents Ti or Zr), a urethane bond, —CH$_2$—CH(OH)—, an amido bond —Hydrophilic Compound—

Examples of the hydrophilic compound include hydrophilic polymers. Hydrophilic polymers function as a binder and, when a hydrophilic polymer is used as a binder in an acidic gas separation layer, the hydrophilic polymer retains moisture and allows the function of separation of gas such as carbon dioxide by a carrier to be exhibited. From the viewpoints that the hydrophilic compound dissolves in water and can form a coating liquid, and that the accelerated transport membrane has a high hydrophilicity (moisture retaining property), the hydrophilic compound is preferably a compound having a high hydrophilicity, and it is preferable to have a hydrophilicity such that the amount of physiological saline absorbed is 0.5 g/g or more. It is more preferable to have a hydrophilicity such that the amount of physiological saline absorbed is 1 g/g or more, it is still more preferable to have a hydrophilicity such that the amount of physiological saline absorbed is 5 g/g or more, it is particularly preferable to have a hydrophilicity such that the amount of physiological saline absorbed is 10 g/g or more, and it is most preferable to have a hydrophilicity such that the amount of physiological saline absorbed is 20 g/g or more.

The weight average molecular weight of the hydrophilic compound is selected as appropriate within the range capable of forming a stable membrane. For example, in the case of having —OH as the crosslinkable group, it is preferable that the weight average molecular weight is 30,000 or more. The weight average molecular weight is more preferably 40,000 or more, and still more preferably 50,000 or more. The upper limit of the weight average molecular weight is not particularly limited, but from the viewpoint of production suitability, it is preferable that the weight average molecular weight is 6,000,000 or less.

Further, in the case of having –NH$_2$ as the crosslinkable group, it is preferable that the weight average molecular weight is 10,000 or more. The weight average molecular weight is more preferably 15,000 or more, and still more preferably 20,000 or more. The upper limit of the weight average molecular weight is not particularly limited, but from the viewpoint of production suitability, it is preferable that the weight average molecular weight is 1,000,000 or less.

Regarding the weight average molecular weight of a hydrophilic compound, for example, in the case of using PVA as the hydrophilic compound, a value obtained by the measurement in accordance with JIS K 6726 is used. Further, in the case of using a commercially available compound, a nominal molecular weight described in catalogues, specifications, or the like is used.

As the crosslinkable group, those capable of forming a hydrolysis-resistant crosslinking structure are selected, and examples thereof include a hydroxyl group (—OH), an amino group (—NH$_2$), a carboxyl group (—COOH), an epoxy group, a chlorine atom (—Cl), and a cyano group (—CN). Among them, an amino group and a hydroxyl group are preferable, and a hydroxyl group is most preferable from the viewpoints of affinity with the carrier and the carrier carrying effect.

Preferable examples of a hydrophilic compound having such a single crosslinkable group include polyallylamine, polyacrylic acid, polyvinyl alcohol, polyacrylamide, polyethyleneimine, polyvinylamine, polyornithine, polylysine, polyethylene oxide, a water-soluble cellulose, starch, alginic acid, chitin, polysulfonic acid, polyhydroxymethacrylate, and poly-N-vinyl acetamide. Polyvinyl alcohol is most preferable. Further, examples of the hydrophilic compound include copolymers of these compounds.

Examples of a hydrophilic compound having the plurality of crosslinkable groups include polyvinyl alcohol-polyacrylic acid salt copolymers. Polyvinyl alcohol-polyacrylic acid copolymers have high water absorbing ability, and in addition, the strength of the hydrogel is great, also at the time of high water absorption, which are thus preferable. The content ratio of the polyacrylic acid in the polyvinyl alcohol-polyacrylic acid copolymer is, for example, from 1 mol % to 95 mol %, preferably from 2 mol % to 70 mol %, more preferably from 3 mol % to 60 mol %, and particularly preferably from 5 mol % to 50 mol %. The polyacrylic acid may form a salt, and examples of the polyacrylic acid salt include an alkali metal salt such as a sodium salt or a potassium salt, an ammonium salt, and an organic ammonium salt.

Polyvinyl alcohols are also available as commercially available products, and examples include PVA117 (trade name, manufactured by Kuraray Co., Ltd.), POVAL (trade name, manufactured by Kuraray Co., Ltd.), polyvinyl alcohol (manufactured by Sigma-Aldrich Corporation), and J-POVAL (trade name, manufactured by JAPAN VAM & POVAL CO., LTD.). There are various grades based on the molecular weight; however, it is preferable to select those having a weight average molecular weight of from 130,000 to 300,000, as described above.

A polyvinyl alcohol-polyacrylic acid salt copolymer (sodium salt) is also available as a commercially available product, and an example thereof is KURASTMER AP20 (trade name, manufactured by Kuraray Co., Ltd.).

Two or more kinds of the hydrophilic compounds may be used in mixture.

Although it depends on the kind, the content of the hydrophilic compound is preferably from 0.5% by mass to 50% by mass, more preferably from 0.75% by mass to 30% by mass, and particularly preferably from 1% by mass to 15% by mass, from the viewpoint of forming a membrane as a binder and providing a hydrophilic compound layer which can sufficiently retain moisture.

—Crosslinking Agent—

The crosslinking structure can be formed in accordance with a conventionally known technique such as heat crosslinking, ultraviolet ray crosslinking, electron-beam crosslinking, radiation crosslinking, or photocrosslinking. Photocrosslinking or heat crosslinking is preferable, and heat crosslinking is most preferable.

In the formation of the hydrophilic compound layer in the exemplary embodiment of the invention, it is preferable to use a composition containing a crosslinking agent together with the hydrophilic compound. Hereinafter, the coating liquid composition for forming a hydrophilic compound layer, which is used for the formation of the hydrophilic compound layer, may be referred to as, simply, "coating liquid composition" or "composition".

As the crosslinking agent, a crosslinking agent that reacts with the hydrophilic compound having a single crosslinkable group or a plurality of crosslinkable groups and has two or more functional groups capable of performing heat crosslinking or photocrosslinking is selected, and it is needed that the crosslinking structure formed is a crosslinking structure including a hydrolysis resistant bond selected from the (B) group described above. From such a point of view, examples of the crosslinking agent, which can be used in the exemplary embodiment of the invention, include an epoxy crosslinking agent, a polyvalent glycidyl ether, a polyhydric alcohol, a polyvalent isocyanate, a polyvalent aziridine, a haloepoxy compound, an aldehyde, a polyvalent amine, and an organometallic crosslinking agent. An aldehyde, an organometallic crosslinking agent, and an epoxy crosslinking agent are preferable, a polyvalent aldehyde and an epoxy crosslinking agent are more preferable, and an aldehyde such as glutaraldehyde having two or more aldehyde groups or formaldehyde is most preferable.

Among the above crosslinking agents, for example, in the case of using, as the hydrophilic compound, a high-molecular weight polyvinyl alcohol having a weight average molecular weight of 130,000 or more, an epoxy compound and glutaraldehyde are particularly preferable from the viewpoints of having favorable reactivity with respect to this hydrophilic compound and being capable of forming a crosslinking structure that also has excellent hydrolysis resistance.

Further, for example, in the case of using polyallylamine having a weight average molecular weight of 10,000 or more, an epoxy compound, glutaraldehyde, and an organometallic crosslinking agent are particularly preferable from the viewpoints of having favorable reactivity with respect to this hydrophilic compound and being capable of forming a crosslinking structure that also has excellent hydrolysis resistance.

In the case of using, as the hydrophilic compound, polyethyleneimine or polyallylamine, an epoxy compound is particularly preferable as the crosslinking agent.

In a case in which the coating liquid composition for forming a hydrophilic compound layer includes a crosslinking agent, the content thereof is preferably from 0.001 parts by mass to 80 parts by mass, more preferably from 0.01 parts by mass to 60 parts by mass, and most preferably from 0.1 parts by mass to 50 parts by mass, with respect to 100 parts by mass of the amount of the crosslinkable group possessed by the hydrophilic compound. When the content is within the above range, the crosslinking structure-formation property is favorable and the shape-maintaining property of the formed gel membrane is excellent.

Further, when giving attention to the crosslinkable group possessed by the hydrophilic compound, it is preferable that the crosslinking structure is a crosslinking structure formed by reacting 0.001 mol to 80 mol of crosslinking agent with respect to 100 mol of the crosslinkable group possessed by the hydrophilic compound.

—Carrier—

A carrier is a water-soluble inorganic substance which has affinity with acidic gas (for example, carbon dioxide), and exhibits basic properties. In the exemplary embodiment of the invention, the carrier is at least one selected from the group consisting of alkali metal compounds, nitrogen-containing compounds, and sulfur compounds.

Note that, the term "carrier" refers to a substance which reacts indirectly with acidic gas, or a substance which itself reacts directly with acidic gas.

Examples of the former include a substance, which reacts with other gas included in the supply gas and exhibits basic properties, and whose basic compound reacts with acidic gas. More specifically, the former refers to such an alkali metal compound which reacts with steam and releases $OH^-$, and can selectively entrap $CO_2$ into the membrane when the $OH^-$ reacts with $CO_2$.

The latter is a substance, which itself is a basic compound, for example, a nitrogen-containing compound or a sulfur compound.

The alkali metal compound is, for example, at least one selected from the group consisting of alkali metal carbonates, alkali metal hydrogencarbonates, and alkali metal hydroxides. Here, as the alkali metal, an alkali metal element selected from the group consisting of cesium, rubidium, potassium, lithium, and sodium is preferably used.

Note that, in this specification, the "alkali metal compound" is used in a sense including the alkali metal itself, a salt thereof and an ion thereof.

Examples of the alkali metal carbonate include lithium carbonate, sodium carbonate, potassium carbonate, rubidium carbonate, and cesium carbonate.

Examples of the alkali metal hydrogencarbonate include lithium hydrogencarbonate, sodium hydrogencarbonate, potassium hydrogencarbonate, rubidium hydrogencarbonate, and cesium hydrogencarbonate.

Examples of the alkali metal hydroxide include lithium hydroxide, sodium hydroxide, potassium hydroxide, cesium hydroxide, and rubidium hydroxide.

Among them, alkali metal carbonates are preferable, and compounds which contain potassium, rubidium, or cesium as an alkali metal atom, and have high solubility are preferable from a viewpoint of having a good affinity with the acidic gas.

Here, in the exemplary embodiment of the invention, since a water-absorbing accelerated transport membrane 32A is used as the carbon oxide separation membrane, the accelerated transport membrane 32A is gelated at the time of manufacture due to absorption of moisture, and a phenomenon (blocking), in which the accelerated transport membranes 32A stick to each other or stick to other member, easily occurs at the time of manufacture. When this blocking occurs, defects may be generated due to the stickiness of the accelerated transport membrane 32A at the time of peeling off the accelerated transport membrane 32A and, as a result, leakage of gas may occur. Accordingly, in the exemplary embodiment of the invention, it is preferable to suppress blocking.

Thus, in the exemplary embodiment of the invention, it is preferable that the carrier includes two or more kinds of alkali metal compounds. This is because, by including two or more kinds of carriers and lengthening the distance between the carriers of the same kind in the membrane, unevenness of blocking is generated and prevention of blocking can be realized.

Further, it is more preferable that the carrier includes a first alkali metal compound having deliquescence, and a second alkali metal compound which has a lower deliquescence and a smaller specific gravity than the deliquescence and the specific gravity of the first alkali metal compound.

Specifically, an example of the first alkali metal compound is cesium carbonate, and an example of the second alkali metal compound is potassium carbonate.

When the carrier includes the first alkali metal salt and the second alkali metal compound, the second alkali metal compound, which has a smaller specific gravity, is arranged at the membrane surface side of the accelerated transport membrane 32A (namely, unevenly distributed and arranged at the surface side (the supply gas flow channel member 30 side) of the accelerated transport membrane 32A), and the first alkali metal compound, which has a greater specific gravity, is arranged at the membrane inner side of the accelerated transport membrane 32A (namely, unevenly distributed and arranged at the porous support 32B side of the accelerated transport membrane 32A). Further, since the second alkali metal compound that is arranged at the membrane surface side has a lower deliquescence than that of the first alkali metal compound, the membrane surface is not sticky, as compared with the case in which the first alkali metal compound is arranged at the membrane surface side, and thus, blocking can be prevented. Moreover, since the first alkali metal compound, which has a higher deliquescence, is arranged at the membrane inner side, blocking can be suppressed and also the carbon dioxide separation efficiency can be enhanced, as compared with the case in which only the second alkali metal compound is arranged over the entire membrane.

Note that, it is enough that the second alkali metal compound exists only at the membrane surface side for the purpose of prevention of blocking, and thus, it is preferable that the second alkali metal compound is included in an amount smaller than the amount of the first alkali metal compound. Thereby, the quantity of the first alkali metal compound having higher deliquescence becomes relatively larger in the entire membrane, and the carbon dioxide separation efficiency can be further enhanced.

Here, the number of kinds of the two or more kinds of alkali metal compounds is defined by the kind of the alkali metal, and even if the counter ion is different, the kind is not counted as two or more kinds. Namely, even if potassium carbonate and potassium hydroxide is used in combination, the number of kinds is counted as one.

The following combinations are preferable as the combination of two or more kinds of alkali metal compounds. In the following table, the alkali metal compound are shown by the name of alkali metal; however, a salt thereof or an ion thereof may be included.

| Combination | Second Alkali Metal Compound | First Alkali Metal Compound |
| --- | --- | --- |
| #1 | Potassium | Cesium |
| #2 | Potassium | Rubidium |
| #3 | Potassium | Cesium/rubidium |

Although it depends on the kind, the content of the whole carrier in the hydrophilic compound layer is preferably from 0.3% by mass to 30% by mass, more preferably from 0.5% by mass to 25% by mass, and particularly preferably from 1% by mass to 20% by mass, in order to prevent salting-out before coating and to reliably exhibit the function of separation of acidic gas.

In a case of using two or more kinds of alkali metal compounds, when the content of the two or more kinds of alkali metal compounds is shown as the content with respect to the total mass of solids of the hydrophilic compound that serves as the main component of the membrane, the two or more alkali metal compounds, and the like, the mass ratio of the two or more kinds of alkali metal compounds is preferably from 25% by mass to 85% by mass, and more preferably from 30% by mass to 80% by mass. When the mass ratio is within this range, the gas separation function can be sufficiently exhibited.

Of the two or more kinds of alkali metal compounds, regarding the second alkali metal compound (the alkali metal compound that is unevenly distributed to the surface side (the supply gas flow channel member 30 side) of the accelerated transport membrane 32A), which has a lower deliquescence and a smaller specific gravity than the deliquescence and specific gravity of the first alkali metal compound, the content of the second alkali metal compound with respect to the total mass of solids of the hydrophilic compound, the two or more alkali metal compounds, and the like (typically, the total mass of the separation layer after drying) is preferably 0.01% by mass or higher, and more preferably 0.02% by mass or higher. The upper limit does not exist particularly, but is preferably 10% by mass or lower, and more preferably 7.5% by mass or lower. When this amount is too small, there are cases in which blocking is not prevented, and when this amount is too large, there are cases in which it is impossible to handle.

The ratio of the first alkali metal compound to the second alkali metal compound is not particularly limited, but it is preferable that the amount of the first alkali metal compound is 50 parts by mass or more, and more preferably 100 parts by mass or more, with respect to 100 parts by mass of the second alkali metal compound. The upper limit is preferably 100,000 parts by mass or less, and more preferably 80,000 parts by mass or less. By adjusting the ratio of these two compounds to fall within this range, both the blocking property and the handling property can be achieved at a high level.

Examples of the nitrogen-containing compound, which can be used, include amino acids such as glycine, alanine, serine, proline, histidine, taurine, or diaminopropionic acid; heterocyclic compounds such as pyridine, piperazine, imidazole, or triazine; alkanolamines such as monoethanolamine, diethanolamine, triethanolamine, monopropanolamine, dipropanolamine, or tripropanolamine; cyclic polyether amines such as cryptand[2.1] or cryptand[2.2]; bicyclic polyether amines such as cryptand[2.2.1] or cryptand[2.2.2]; porphyrin, phthalocyanine, and ethylenediamine tetraacetate.

Examples of the sulfur compound, which can be used, include amino acids such as cystine or cysteine; polythiophene, and dodecylthiol.

—Other Component—

In the composition used for the formation of the accelerated transport membrane 32A, various additive may be used together with the hydrophilic compound, the crosslinking agent, and the carbon dioxide carrier. Further, water as the solvent may be added to a composition which is dried during the manufacture and includes a smaller amount of water.

— Antioxidant—

The coating liquid composition may contain an antioxidant, as long as the effects of the exemplary embodiment of the invention are not impaired. Addition of an antioxidant is advantageous for further improving the wet heat resistance.

Commercially available products may be used as the antioxidant, and preferable examples of the antioxidant include dibutylhydroxytoluene (BHT), IRGANOX 1010, IRGANOX 1035FF, and IRGANOX 565.

—Gelling Agent—

The coating liquid composition may contain a gelling agent, for the purpose of controlling the setting property of the membrane or the viscosity. By the addition of the gelling agent, the setting property, when a coated film of the coating liquid composition is formed, or the viscosity can be controlled.

As the gelling agent, a gelling agent which can form a gel membrane (set membrane) having high film thickness uniformity, when a coated film of a coating liquid composition including the gelling agent is formed or when the coated film is cooled, may be used.

Examples of a gelling agent having reduced dependency on temperature include thickeners such as carboxymethyl cellulose. Further, examples of a gelling agent capable of forming a gel membrane by cooling include thickening polysaccharides, and more specifically, agars. As such a polysaccharide, agar is preferable from the viewpoints of film forming property, availability, cost, membrane strength, and the like. Examples of a commercially available product include INA AGAR UP-37, UM-11S, SY-8, ZY-4, and ZY-6 (all trade names, manufactured by Ina Food Industry Co., Ltd.), and AGAROSE H and AGAROSE S (all trade names, manufactured by NIPPON GENE CO., LTD.).

A specific example of the gelling agent capable of forming a gel membrane by cooling is a gelling agent having a nature such that, when a coating liquid composition including a hydrophilic polymer, a carbon dioxide carrier, a gelling agent, and water is prepared at a temperature of 50° C. or higher, in the solution membrane thickness of 1 mm or less, gelation occurs within 120 seconds under the temperature condition of 12° C., and the liquid does not fall due to gravity.

Regarding the content of the polysaccharide in the coating liquid for forming a carbon dioxide separation layer, although it depends on the kind, when the content of the polysaccharide is too large, there are cases in which the coating liquid becomes highly viscous in a short time such that coating becomes difficult, and there is a possibility that coating defects may occur. Further, from the viewpoint of suppressing the lowering of uniformity in film thickness, the content of the polysaccharide is preferably 10% by mass or less, more preferably from 0.1% by mass to 8% by mass, and still more preferably from 0.3% by mass to 5% by mass, with respect to the total mass of the coating liquid for forming a carbon dioxide separation layer.

—Specific Compound and Polymer Particle—

The composition of the accelerated transport membrane 32A may contain, as the additive, one or two or more selected from the group consisting of: (1) a compound having, as a hydrophobic portion, an alkyl group having from 3 to 20 carbon atoms or a fluoroalkyl group having from 3 to 20 carbon atoms, and a hydrophilic group as a hydrophilic portion, (2) a compound having a siloxane structure, and (3) polymer particles having an average particle diameter of from 0.01 μm to 1,000 μm and a specific gravity of from 0.5 $g/cm^3$ to 1.3 $g/cm^3$.

In the case of forming an accelerated transport membrane 32A including one or two or more of the above substances, the specific compound and/or the polymer particles are not merely present in the accelerated transport membrane 32A, but in the exemplary embodiment of the invention, the specific compound and/or the polymer particles are distributed unevenly in the vicinity of the membrane surface, as if a membrane of the specific compound and/or the polymer particles is formed apparently. In this process, the specific compound and/or the polymer particles are distributed unevenly such that carbon dioxide is permeable. By having such a configuration, occurrence of blocking can be effectively suppressed when continuous membrane formation is performed, while maintaining favorable acidic gas separation property. As a result, productivity can be improved by the prevention of occurrence of membrane peeling. This is especially effective in the case of performing continuous roll to roll membrane formation.

(Specific Compound)

The accelerated transport membrane 32A does not contain or contains the polymer particles described below, and contains one or two or more of compounds (specific compounds) selected from the group consisting of a compound including an alkyl group having from 3 to 20 carbon atoms or a fluoroalkyl group having from 3 to 20 carbon atoms and a hydrophilic group, and a compound having a siloxane structure.

The content of the specific compound is preferably from 0.0001% by mass to 1% by mass, more preferably from 0.0003% by mass to 0.8% by mass, and still more preferably from 0.001% by mass to 0.1% by mass, with respect to the total mass of the composition of the accelerated transport membrane 32A. When the content of the specific compound is 0.0001% by mass or higher, the effect on prevention of occurrence of blocking is more excellent. Further, when the content of the specific compound is 1% by mass or lower, the property for separation of acidic gas such as carbon dioxide is maintained well.

The compound including an alkyl group having from 3 to 20 carbon atoms or a fluoroalkyl group having from 3 to 20 carbon atoms and a hydrophilic group is easily distributed unevenly on the membrane surface so as to cover the surface, when a coated layer is formed by coating, and is effective in preventing the occurrence of blocking Specifically, in the process of forming an accelerated transport membrane 32A including a compound having an alkyl group or a fluoroalkyl group, the compound is orientated to the membrane surface because of the alkyl group or fluoroalkyl group having high hydrophobicity, and by reducing the surface energy of the membrane surface, blocking can be effectively prevented. Thus, it is preferable that the compound has an alkyl group or fluoroalkyl group having high hydrophobicity, namely, having a long carbon chain.

As this compound, a compound which has a hydrophobic portion and a hydrophilic portion, and includes, as the hydrophobic portion, an alkyl group having from 3 to 20 carbon atoms or a fluoroalkyl group having from 3 to 20 carbon atoms can be used. A specific example is a surfactant including an alkyl group having from 3 to 20 carbon atoms or a fluoroalkyl group having from 3 to 20 carbon atoms in the hydrophobic portion.

Examples of the alkyl group having from 3 to 20 carbon atoms include groups such as propyl, butyl, pentyl, hexyl, octyl, decyl, dodecyl, or eicosyl. Above all, from the viewpoint of ease of uneven distribution on the membrane surface, it is preferable to have a long-chain alkyl group. Specifically, an alkyl group having from 5 to 20 carbon atoms is more preferable, and an alkyl group having from 6 to 20 carbon atoms is still more preferable. Above all, the case of having hexyl, octyl, decyl, dodecyl, or eicosyl, as the alkyl group, is particularly preferable.

Examples of the fluoroalkyl group having from 3 to 20 carbon atoms include groups such as fluoropropyl, perfluorobutyl, perfluorohexyl, perfluorooctyl, or perfluorodecyl. Above all, from the viewpoint of ease of uneven distribution on the membrane surface, it is preferable to have a fluoroalkyl group with a long carbon chain. Specifically, a fluoroalkyl group having from 4 to 20 carbon atoms is preferable, a fluoroalkyl group having from 5 to 20 carbon atoms is more preferable, and a fluoroalkyl group having from 6 to 20 carbon atoms is still more preferable. Above all, it is particularly preferable to have, as the fluoroalkyl group, perfluorohexyl, perfluorooctyl, or perfluorodecyl.

Among the above alkyl groups and fluoroalkyl groups, the alkyl groups that do not have a fluorine atom are more preferable than the fluoroalkyl groups, from the viewpoint of achieving both the prevention of blocking and excellent acidic gas separation property at a high level.

Examples of the hydrophilic group include a hydroxyl group, a carboxyl group, a sulfonic acid group, a phosphoric acid group, an alkyleneoxy group, an amino group, and a quaternary ammonium group.

Examples of the surfactant including an alkyl group having from 3 to 20 carbon atoms or a fluoroalkyl group having from 3 to 20 carbon atoms may further include the following compounds.

The molecular weight of the surfactant including an alkyl group having from 3 to 20 carbon atoms or a fluoroalkyl group having from 3 to 20 carbon atoms is preferably in a range of from 60 to 2,000, and more preferably in a range of from 80 to 1,500. The molecular weight being 60 or more is advantageous in that the membrane surface can uniformly suppress blocking. When the molecular weight is 2,000 or less, acidic gas separation property can also be ensured, while suppressing blocking.

In the case of forming an accelerated transport membrane 32A including "a surfactant including an alkyl group having from 3 to 20 carbon atoms or a fluoroalkyl group having from 3 to 20 carbon atoms", the content of the surfactant is preferably from 0.01% by mass to 10% by mass, and more preferably from 0.01% by mass to 3% by mass, with respect to the total solids of the accelerated transport membrane 32A. When the content of the "surfactant including an alkyl group having from 3 to 20 carbon atoms or a fluoroalkyl group having from 3 to 20 carbon atoms" is 0.01% by mass or higher, the effect on prevention of occurrence of blocking is more excellent. Further, when the content of the surfactant is 10% by mass or lower, the property for separation of acidic gas such as carbon dioxide is maintained well.

[Compound Having Siloxane Structure]

The compound having a siloxane structure is easily distributed unevenly on the membrane surface so as to cover the surface, when the accelerated transport membrane 32A is formed by coating, and is effective in preventing the occurrence of blocking. The "siloxane structure" is not particularly limited, as long as the structure has a siloxane skeleton represented by "—Si—O—Si—", as a partial structure.

The compound having a siloxane structure is preferably a compound including a structure unit having a siloxane structure in the side chain, from the viewpoint of enhancing the surface segregating property, when the accelerated transport membrane 32A is formed by coating.

A siloxane compound useful in introducing a siloxane structure into the molecule is available as a commercially available product currently marketed, and examples thereof include one-terminal reactive silicones such as X-22-173DX and X-22-173BX (all trade names, manufactured by Shin-Etsu Chemical Co., Ltd.).

Such a compound can be synthesized by reacting a siloxane having a reactive terminal and a compound having a cationic polymerizable group. For example, such a compound can be synthesized from a compound having a one-terminal hydroxyl group such as SILAPLANE series FM-0411, FM-0421, or FM-0425 (all trade names, manufactured by JNC Corporation) and epichlorohydrin, or can be synthesized in accordance with the method described in JP-A No. H11-80315.

In the case of forming an accelerated transport membrane 32A including a compound having a siloxane structure, the content of the compound having a siloxane structure is preferably from 0.01% by mass to 10% by mass, and more preferably from 0.01% by mass to 3% by mass, with respect to the total solids of the accelerated transport membrane 32A. When the content of the compound having a siloxane structure is 0.01% by mass or higher, the effect on prevention of occurrence of blocking is more excellent. Further, when the content of the compound having a siloxane structure is 10% by mass or lower, the property for separation of acidic gas such as carbon dioxide is maintained well.

(Polymer Particles)

Preferable examples of the polymer particles include particles of polyolefin (for example, polyethylene, polypropylene, polymethyl pentene, or the like), polymethyl methacrylate, polystyrene, a thermoplastic elastomer, silicone, or the like.

The average particle diameter of the polymer particles is in a range of from 0.01 μm to 1,000 μm. When the average particle diameter of the polymer particles is less than 0.01 μm, the particles are filled too dense, and therefore, the area of polymer particles that occupy the membrane surface, when a coated membrane is formed, cannot be ensured without lowering the separation performance. Further, when the average particle diameter of the polymer particles exceeds 1,000 μm, the polymer that exists on the membrane surface is too much to cover the membrane surface, when a coated membrane is formed, such that the carbon dioxide permeability may be lowered as well as the polymer particle may fall down. Above all, the average particle diameter of the polymer particles is preferably in a range of from 0.02 μm to 750 μm, more preferably in a range of from 0.03 μm to 500 μm, and particularly preferably in a range of from 0.1 μm to 50 μm.

The particle diameter of the polymer particle is a value measured using an FPAR 1000 (trade name, manufactured by Otsuka Electronics Co., Ltd.).

The specific gravity of the polymer particle is in a range of from 0.5 $g/cm^3$ to 1.3 $g/cm^3$. When the specific gravity of the polymer particle is too small and is less than 0.5 $g/cm^3$, the polymer particle easily blocks the membrane surface, and the permeability of carbon dioxide is rather damaged. When the specific gravity of the polymer particle exceeds 1.3 $g/cm^3$, the polymer particle is prone to sink in the coating liquid, and the polymer is less likely to exist on the membrane surface when a coated membrane is formed, and thus, the effect on prevention of blocking is lowered. Above all, the specific gravity of the polymer particle is more preferably in a range of from 0.52 $g/cm^3$ to 1.28 $g/cm^3$, and still more preferably in a range of from 0.55 $g/cm^3$ to 1.27 $g/cm^3$.

The polymer particles can be used, for example, in the form of an emulsion in which a polymer in the liquid state is dispersed in an aqueous medium, or in the form of a dispersion (suspension) in which a polymer in the solid state is dispersed in an aqueous medium.

As for the polymer particles, a commercially available product currently marketed may be used and, for example, CHEMIPEARL W-308, W-400, W-100, WP-100, or A-100 (all trade names, manufactured by Mitsui Chemicals, Inc.), or the like can be used.

In a case in which the accelerated transport membrane 32A contains polymer particles, it is preferable that the total content of the polymer particles in the accelerated transport membrane 32A is an amount such that the occupation area of the polymer particles in the surface of the accelerated transport membrane 32A is from 0.1% to 60%. When the occupation area of the polymer particles is 0.1% or more, the effect on prevention of occurrence of blocking is more excellent. When the occupation area of the polymer particles is 60% or less, favorable acidic gas separation property can be maintained, while preventing blocking. The occupation area of the polymer particles is more preferably from 0.5% to 30%, and still more preferably from 1% to 10%.

The occupation area can be determined by performing image analysis to obtain the particle coverage factor per unit area, using a scanning electron microscope (trade name: JSM6610, manufactured by JEOL Ltd.).

In the case of forming an accelerated transport membrane 32A by coating, using the polymer particles, since the specific gravity of the polymer particles is low, the polymer particles is unevenly distributed on the surface of the coated membrane, during the process of forming an accelerated transport membrane 32A using a coating liquid that contains the polymer particles and drying the membrane. Thereby, without performing a special treatment of applying the polymer particles only to the surface or the like, the polymer particles are unevenly distributed on the surface and prevent blocking.

Alternatively, an accelerated transport membrane 32A may be formed as a layer having the polymer particles or specific compounds unevenly distributed on the membrane surface by performing multilayer coating as follows. Namely, a first coating liquid containing the polymer particles or the specific compounds described above, and a second coating liquid that does not contain the polymer particles or the specific compounds are each prepared, and the second coating liquid and the first coating liquid are coated in this order on the porous support 32B.

Since all these compounds or polymer particles, and other components which constitute the hydrophilic compound layer do not dissolve mutually, the separation ability that the hydrophilic compound layer originally has is never damaged.

(Porous Support)

The porous support 32B that constitutes the acidic gas separation layer 32 together with the accelerated transport membrane 32A has heat resistance, similar to the accelerated transport membrane 32A.

As the material of the porous support 32B, the same material as the material of the supply gas flow channel member 30 can be used.

When the porous support 32B is too thick, the gas permeability is lowered, and when the porous support is too thin, the strength is deteriorated. Thus, the thickness of the support is preferably from 30 μm to 500 μm, more preferably from 50 μm to 450 μm, and particularly preferably from 50 μm to 400 μm.

Further, from the viewpoint of allowing the adhesive agent to sufficiently penetrate in the region where the adhesive agent is coated, and not preventing the passage of gas in the region where the gas is allowed to pass through, the average pore diameter of the pores of the porous support 32B is preferably from 0.001 μm to 10 μm, more preferably from 0.002 μm to 5 μm, and particularly preferably from 0.005 μm to 1 μm.

(Permeating Gas Flow Channel Member)

The permeating gas flow channel member 36 that constitutes the layered body 14 together with the acidic gas separation layer 32 is a member, through which the acidic gas 22 that has been reacted with the carrier and has permeated through the acidic gas separation layer 32 flows toward the through hole 12A. The permeating gas flow channel member 36 is preferably a net-shaped member, similar to the supply gas flow channel member 30, such that the permeating gas flow channel member 36 has a function as a spacer, and has a function of allowing the acidic gas 22 that has permeated to flow at the inner side than the permeating gas flow channel member 36, and further has a function of allowing the bonding portions 34 and 40 to penetrate. As the material of the permeating gas flow channel member 36, the same material as the material of the supply gas flow channel member 30 can be used. Further, assuming that a source gas 20 containing steam at high temperature is made to flow, it is preferable that the permeating gas flow channel member 36 has wet heat resistance, similar to the acidic gas separation layer 32.

The specific material used in the permeating gas flow channel member 36 is preferably a polyester based material such as epoxy-impregnated polyester, a polyolefin based material such as polypropylene, or a fluorine-containing material such as polytetrafluoroethylene.

The thickness of the permeating gas flow channel member 36 is not particularly limited, but is preferably from 100 μm to 1,000 μm, more preferably from 150 μm to 950 μm, and still more preferably from 200 μm to 900 μm.

The permeating gas flow channel member 36 is a flow channel for the acidic gas 22 that has permeated through the acidic gas separation layer 32, and therefore, it is preferable that the resistance is small, specifically, it is preferable that the void fraction is high, the degree of deformation when pressure is applied is small, and the pressure loss is small.

The void fraction is preferably from 30% to 99%, more preferably from 35% to 97.5%, and still more preferably from 40% to 95%. Here, the measurement of void fraction can be performed as follows. First, the void portions of the permeating gas flow channel member 36 are sufficiently soaked with water by utilizing ultrasonic wave or the like, then the extra water on the surface is removed, and then the weight per unit area is measured. The value obtained by subtracting the dry weight from the above weight is the weight of water that has penetrated into the voids of the permeating gas flow channel member 36. By calculation using the density of water, the void volume as well as the void fraction can be measured.

In this process, in a case in which water does not penetrate sufficiently, it is also possible to conduct measurement by using a solvent having a low surface tension, such as an alcohol-based solvent.

The degree of deformation when pressure is applied can be approximated by the elongation when a stretching test is performed. It is preferable that the elongation when a load of 10 N/10 mm in width is applied is 5% or less, and it is more preferable that the elongation is 4% or less.

Further, the pressure loss can be approximated by the loss of flow rate of compressed air, which is made to flow at a constant flow rate. It is preferable that the loss is 7.5 L/min or less, when compressed air is made to flow at a flow rate of 15 L/min and at room temperature, through a permeating gas flow channel member 36 having a size of 15 cm square, and it is more preferable that the loss is 7 L/min or less.

(Bonding Portion)

The bonding portion 34 and the bonding portion 40 are each an adhesive agent having wet heat resistance.

Note that, in the exemplary embodiment of the invention, the "heat resistance" in the "wet heat resistance" of the bonding portion 34 and bonding portion 40 means that the glass transition temperature Tg after curing is 40° C. or higher, and particularly, the glass transition temperature after curing is preferably 60° C. or higher. Further, in the exemplary embodiment of the invention, the "wet resistance" in the "wet heat resistance" of the bonding portion 34 and bonding portion 40 means that, even after storage for two hours under the conditions of 80° C. and 80% RH, the adhesive force is not reduced by one half. Enhancement of the wet heat resistance can be realized by changing the material (main component) of the bonding portion 34 and bonding portion 40 or by dissolving, in the main component thereof, 1 part by mass to 50 parts by mass of filler such as polystyrene, liquid paraffin, or silica, to increase the viscosity.

The material of the bonding portion 34 and bonding portion 40 is not particularly limited as long as the material has wet heat resistance. Examples thereof include epoxy resins, vinyl chloride copolymers, vinyl chloride-vinyl acetate copolymers, vinyl chloride-vinylidene chloride copolymers, vinyl chloride-acrylonitrile copolymers, butadiene-acrylonitrile copolymers, polyamide resins, polyvinyl butyral, polyester, cellulose derivatives (nitrocellulose and the like), styrene-butadiene copolymers, various synthetic rubber-based resins, phenol resins, urea resins, melamine resins, phenoxy resins, silicone resins, and urea-formamide resins.

FIG. 7 is a diagram showing the state before winding the layered body 14 on the permeating gas collecting tube 12 in the acidic gas separation module 10, and is a diagram representing one exemplary embodiment of the formation regions of bonding portion 34 and bonding portion 40.

As shown in FIG. 7, the bonding portion 40 bonds the acidic gas separation layer 32 and the permeating gas flow channel member 36, in the state in which the through holes 12A are covered with the permeating gas flow channel member 36, and the layered body 14 is wound on the permeating gas collecting tube 12 toward the direction indicated by the arrow R in the diagram. On the other hand, the bonding portion 34 bonds the acidic gas separation layer 32 and the permeating gas flow channel member 36, before winding the layered body 14 on the permeating gas collecting tube 12.

Both the bonding portion 34 and the bonding portion 40 have circumferential direction bonding portions 34A and 40A, respectively, each of which bonds the both side end portions of the acidic gas separation layer 32 and permeating gas flow channel member 36, along the circumferential direction of the permeating gas collecting tube 12, and axial direction bonding portions 34B and 40B, respectively, each of which bonds the circumferential direction end portions of the acidic gas separation layer 32 and permeating gas flow channel member 36.

The circumferential direction bonding portion 34A and the axial direction bonding portion 34B are linked together, and the bonding portion 34 as a whole has an envelope shape, in which the circumferential direction end portion between the acidic gas separation layer 32 and the permeating gas flow channel member 36 on the winding start side is open. Further, between the circumferential direction bonding portions 34A and the axial direction bonding portion 34B, a flow path P1 is formed, through which the acidic gas 22 that has permeated through the acidic gas separation layer 32 flows to the through holes 12A.

Similarly, the circumferential direction bonding portion 40A and the axial direction bonding portion 40B are linked together, and the bonding portion 40 as a whole has a so-called "envelope shape", in which the circumferential direction end portion between the acidic gas separation layer 32 and the permeating gas flow channel member 36 on the winding start side is open. Further, between the circumferential direction bonding portions 40A and the axial direction bonding portion 40B, a flow path P2 is formed, through which the acidic gas 22 that has permeated through the acidic gas separation layer 32 flows to the through holes 12A.

In the exemplary embodiment of the invention, since the accelerated transport membrane 32A is used as the acidic gas separation membrane, moisture contained in the membrane oozes to the porous support 32B to enhance the wetting property of the porous support 32B, or the adhesive agent is drawn in, due to the surface tension thereof. Thus, the adhesive agent of the bonding portion 34 and bonding portion 40 easily penetrates into the pores of the porous support 32B via the permeating gas flow channel member 36. Accordingly, not by a technique of forming the circumferential direction bonding portions 34A and 40A in accordance with the potting method as described in JP-A No. 2010-42374, but by a usual coating method, the adhesive force of the bonding portion 34 and bonding portion 40 is strengthened and, as a result, leakage of gas can be suppressed.

(Method for Manufacturing Acidic Gas Separation Module)

Next, the method for manufacturing the acidic gas separation module 10 having the configuration described above is explained.

Figure 8A:
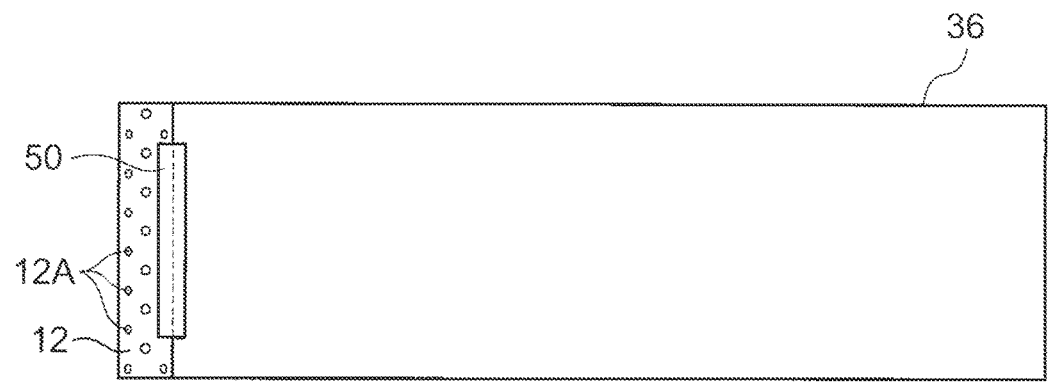
FIG. 8A is a manufacturing process diagram of one exemplary embodiment of an acidic gas separation module of the invention.
Figure 8B:
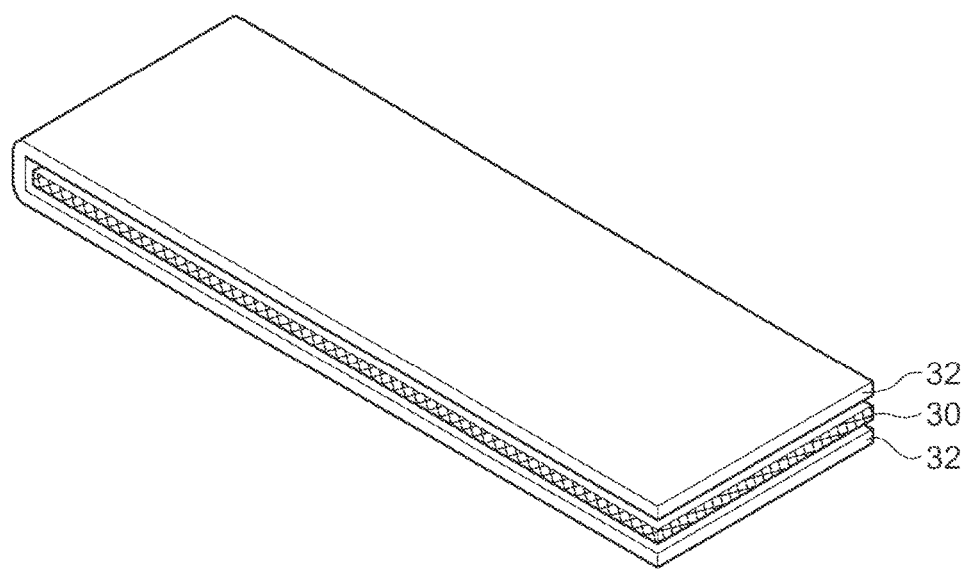
FIG. 8B is a manufacturing process diagram of an acidic gas separation module, following FIG. 8A.
Figure 8C:
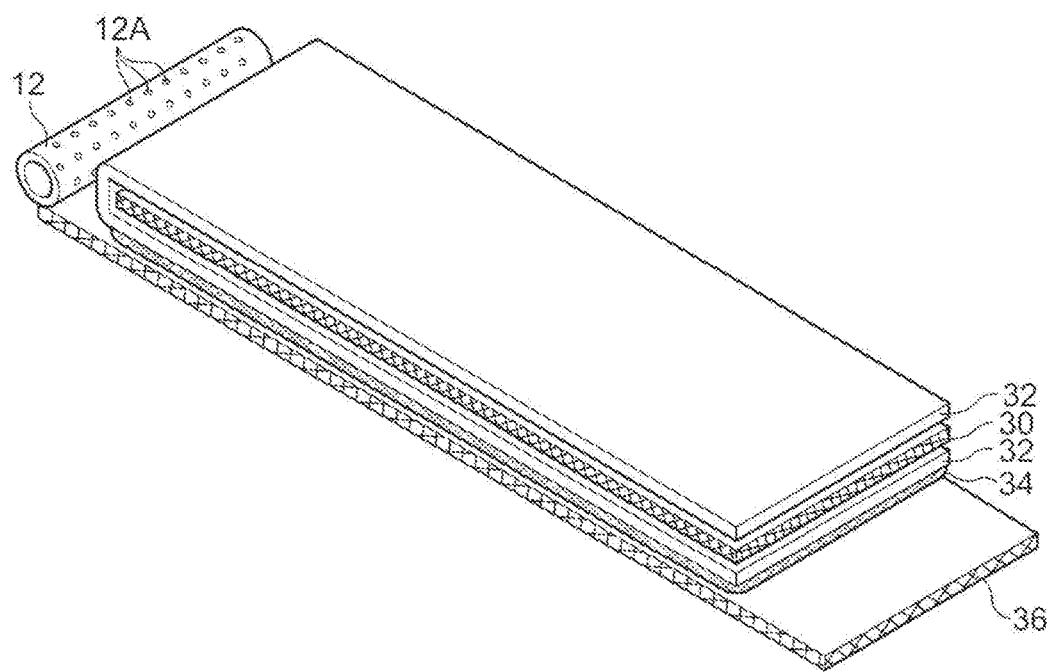
FIG. 8C is a manufacturing process diagram of an acidic gas separation module, following FIG. 8B.

FIG. 8A to FIG. 8C are manufacturing process diagrams of the acidic gas separation module 10.

In the method for manufacturing the acidic gas separation module 10 of the exemplary embodiment of the invention, first, as shown in FIG. 8A, the tip of a long-shaped permeating gas flow channel member 36 is fixed to the tube wall (outer peripheral face) of a permeating gas collecting tube 12 with a fixation member 50, such as KAPTON (registered trademark) tape or an adhesive agent.

Here, it is preferable that the tube wall is provided with a slit (not shown in the figure) along the axial direction. In this case, the tip of the permeating gas flow channel member 36 is inserted into the slit, and the tip is fixed to the inner peripheral face of the permeating gas collecting tube 12 with the fixation member 50. With the configuration described above, when the layered body 14 including the permeating gas flow channel member 36 is wound on the permeating gas collecting tube 12, even if winding is performed while applying tension, the permeating gas flow channel member 36 does not fall out from the slit, due to friction between the inner peripheral face of the permeating gas collecting tube 12 and the permeating gas flow channel member 36, that is, the fixation of the permeating gas flow channel member 36 is maintained.

Next, as shown in FIG. 8B, a long-shaped supply gas flow channel member 30 is put between the two-folded long-shaped acidic gas separation layer 32 that has been folded in such a manner that the accelerated transport membrane 32A is on the inward side. Here, in folding the accelerated transport membrane 32A in two, the accelerated transport membrane 32A may be folded in half, or may be unevenly folded.

Next, with respect to one outer surface (the surface of the porous support 32B) of the outer surfaces of the tow-folded accelerated transport membrane 32A, an adhesive agent 52 is coated (coated in an envelope shape) on the both width direction end portions and one longitudinal direction end portion of the membrane. In this way, a bonding portion 34, namely, circumferential direction bonding portions 34A and an axial direction bonding portion 34B are formed.

In order to suppress leakage of gas, it is preferable to fill in 10% or more, particularly 30% of pores, among the pores of this porous support 32B, with the adhesive agent 34. As a means for filling as described above, for example, JP-A No. H3-68428 and the like can be utilized.

Next, as shown in FIG. 8C, the acidic gas separation layer 32 with the supply gas flow channel member 30 sandwiched therebetween, is pasted to the surface of the permeating gas flow channel member 36 that is fixed to the permeating gas collecting tube 12, via the bonding portion 34. Here, in pasting the acidic gas separation layer 32, pasting is performed such that the axial direction bonding portion 34B is away from the permeating gas collecting tube 12. Thus, the bonding portion 34 as a whole has a shape, in which the circumferential direction end portion between the acidic gas separation layer 32 and the permeating gas flow channel member 36 on the winding start side is open, and a flow path P1, through which the acidic gas 22 that has permeated through the acidic gas separation layer 32 flows to the through holes 12A, is formed between the circumferential direction bonding portions 34A and the axial direction bonding portion 34B.

Next, with respect to the surface (the surface opposite from the pasted surface) of the acidic gas separation layer 32 to which the permeating gas flow channel member 36 has been pasted, an adhesive agent 54 is coated on the both width direction end portions and one longitudinal direction end portion of the membrane. In this way, a bonding portion 40, namely, circumferential direction bonding portions 40A and an axial direction bonding portion 40B are formed, and a layered body 14 is formed.

Next, the layered body 14 is multilayerdly wound on the permeating gas collecting tube 12 toward the direction indicated by the arrow R in the diagram, such that the through holes 12A are covered with the permeating gas flow channel member 36. In this process, it is preferable that the layered body 14 is wound up, while applying tension. As a result, the adhesive agents 52 and 54 of the bonding portions 34 and 40, particularly, the adhesive agent 54 of the bonding portion 40 easily penetrates into the pores of the porous support 32B and thus, leakage of gas can be suppressed. Further, in order to apply tension, as described above, it is preferable to insert the tip of the permeating gas flow channel member 36 into a slit and fix the tip, such that the fixation of the permeating gas flow channel member 36 is not released.

By going through the above processes, an acidic gas separation module 10 shown in FIG. 1 is obtained.

(Variation Examples)

The acidic gas separation module 10 is not limited to the above configuration, and may have another form.

For example, in the above exemplary embodiment, the case in which the acidic gas separation module 10 has a configuration in which, when a source gas 20 including an acidic gas is supplied to the layered body 14 from the side of one end portion 10A thereof, the source gas 20 is separated into an acidic gas 22 and a residual gas 24, and the gases are separately discharged to the side of the other end portion 10B is explained. However, the acidic gas separation module 10 may have a configuration, in which a source gas 20 including an acidic gas is supplied to the layered body 14 from the side of the other end portion 10B thereof, the source gas 20 is separated into an acidic gas 22 and a residual gas 24, and the gases are separately discharged to the side of the other end portion 10B.

Further, in the above exemplary embodiment, the case in which the supply gas flow channel member 30 is put between the two-folded acidic gas separation layer 32 is explained; however, a configuration in which the acidic gas separation layer 32 and the supply gas flow channel member 30 are merely layered one on another may be adopted. In this case, the layered body 14 may be formed, for example, by layering the permeating gas flow channel member 36, the bonding portion 34, the acidic gas separation layer 32, the supply gas flow channel member 30, and the bonding portion 40 (double-sided tape or the like), in this order from the permeating gas collecting tube 12 side.

In order to improve the strength of the acidic gas separation module 10 and to fix the telescope prevention plates 18, the acidic gas separation module 10 may be reinforced with FRP (fiber reinforced plastics). The kind of fiber or matrix resin used in FRP is not limited. Examples of the fiber include glass fiber, carbon fiber, KEVLAR (registered trademark), and DYNEEMA (registered trademark). Among them, glass fiber is particularly preferable. Examples of the matrix resin include an epoxy resin, a polyamide resin, an acrylate resin, and an unsaturated polyester resin. From the viewpoints of heat resistance and hydrolysis resistance, an epoxy resin is preferable.

There is no particular limitation as to the container for storing the acidic gas separation module 10. However, when a container having two or more entrances for source gas 20 on the diagonal line, or a container having a manifold, such that the gas is uniformly applied to the end face of the acidic gas separation module, is used, the separation efficiency is further improved.

Further, in order to adjust the flow rate or flow speed of the gas that flows into per one module of the acidic gas separation modules 10, and to control the pressure loss, a plurality of acidic gas separation modules 10 may be arranged in parallel in the container. Alternatively, the plurality of acidic gas separation modules 10 may be connected in series in the container.

Moreover, in the above exemplary embodiment, the case in which the side of one end portion of the permeating gas collecting tube 12 is closed is explained. However, the side of this end portion may be open and a sweep gas selected from inert gases and the like may be supplied from this opening.

Figure 9:
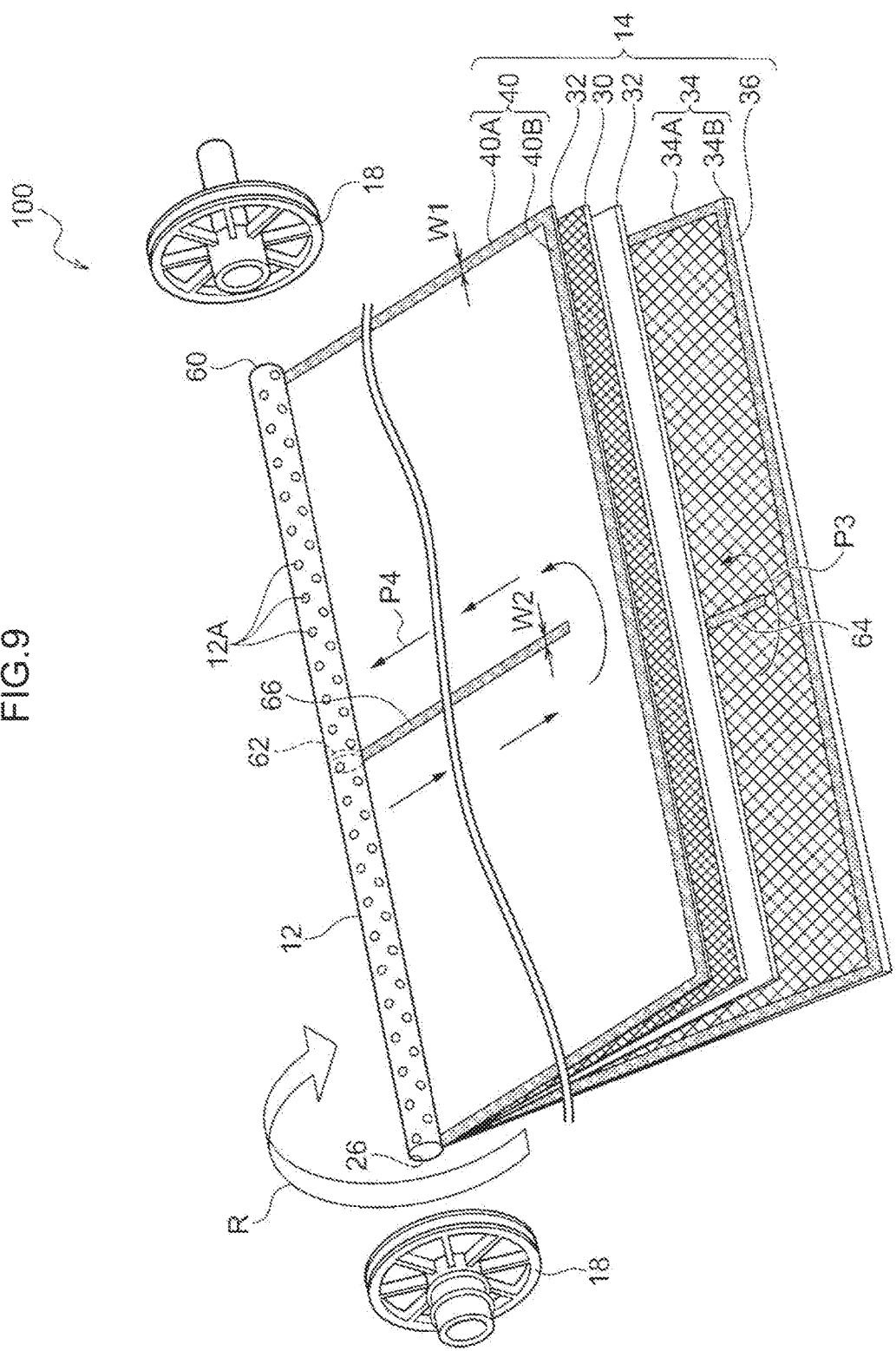
FIG. 9 is a diagram showing a variation example of the acidic gas separation module shown in FIG. 7.

In this case, it is preferable to use an acidic gas separation module 100 as shown in FIG. 9, instead of using the acidic gas separation module 10. FIG. 9 is a diagram showing a variation example of the acidic gas separation module 10 shown in FIG. 7.

As shown in FIG. 9, in the acidic gas separation module 100, the layered body 14 is wound in multiple layers on the permeating gas collection tube 12, similar to the acidic gas separation module 10. However, in the acidic gas separation module 100, the permeating gas collecting tube 12 has a discharge port 26, which is provided at one end portion of the tube and through which the acidic gas 22 that has been collected from the through holes 12A is discharged, and a supply port 60 which is provided at the other end portion of the tube and to which a sweep gas is supplied. Further, the permeating gas collecting tube 12 has a blocking member 62, which is provided at the central part of the tube and blocks the interior part of the tube. Note that, in the acidic gas collecting tube 12, the blocking member 62 may be provided at any position between the discharge port 26 and the supply port 60, the position being not limited to the central part of the tube.

Further, in the acidic gas separation module 100, a partition bonding portion 64 is formed along the circumferential direction (before winding, the length direction of the layered body 14), between the circumferential direction bonding portions 34A and on the periphery side of the blocking member 62. This partition bonding portion 64 is not in contact with the axial direction bonding portion 34B, and forms a flow path P3, through which the sweep gas flows, between the circumferential direction bonding portions 34A and the axial direction bonding portion 34B.

Similarly, in the acidic gas separation module 100, a partition bonding portion 66 is formed along the circumferential direction (before winding, the length direction of the layered body 14), between the circumferential direction bonding portions 40A and on the periphery side of the blocking member 62. This partition bonding portion 66 is not in contact with the axial direction bonding portion 40B, and forms a flow path P4, through which the sweep gas flows, between the circumferential direction bonding portions 40A and the axial direction bonding portion 40B.

Since the flow paths P3 and P4, through which the sweep gas flows are formed as described above, the acidic gas is allowed to flow toward the through holes 12A, without being left undelivered between the bonding portion 34 or 40. As a result, leakage of gas is suppressed and the acidic gas separation efficiency is enhanced.

Since the partition bonding portions 64 and 66 are provided only for forming the flow paths P3 and P4, respectively, it is preferable that the width thereof (W2) is narrower than the width (W1) of the circumferential direction bonding portion 34A or 40A. It is because, it becomes harder for the acidic gas to permeate from the acidic gas separation layer 32 for the existence of the partition bonding portions 64 and 66, and thus, it is preferable that the width is as narrow as possible.

The position of the blocking member 62 shown in FIG. 9 is not limited to the central part of the tube, and the blocking member may be positioned at one end portion side of the tube. In this case, the positions of the partition bonding portions 64 and 66 are also adjusted according to the position of the blocking member 62. The number of blocking member 62 is not limited to one, and may be plural.

Figure 10:
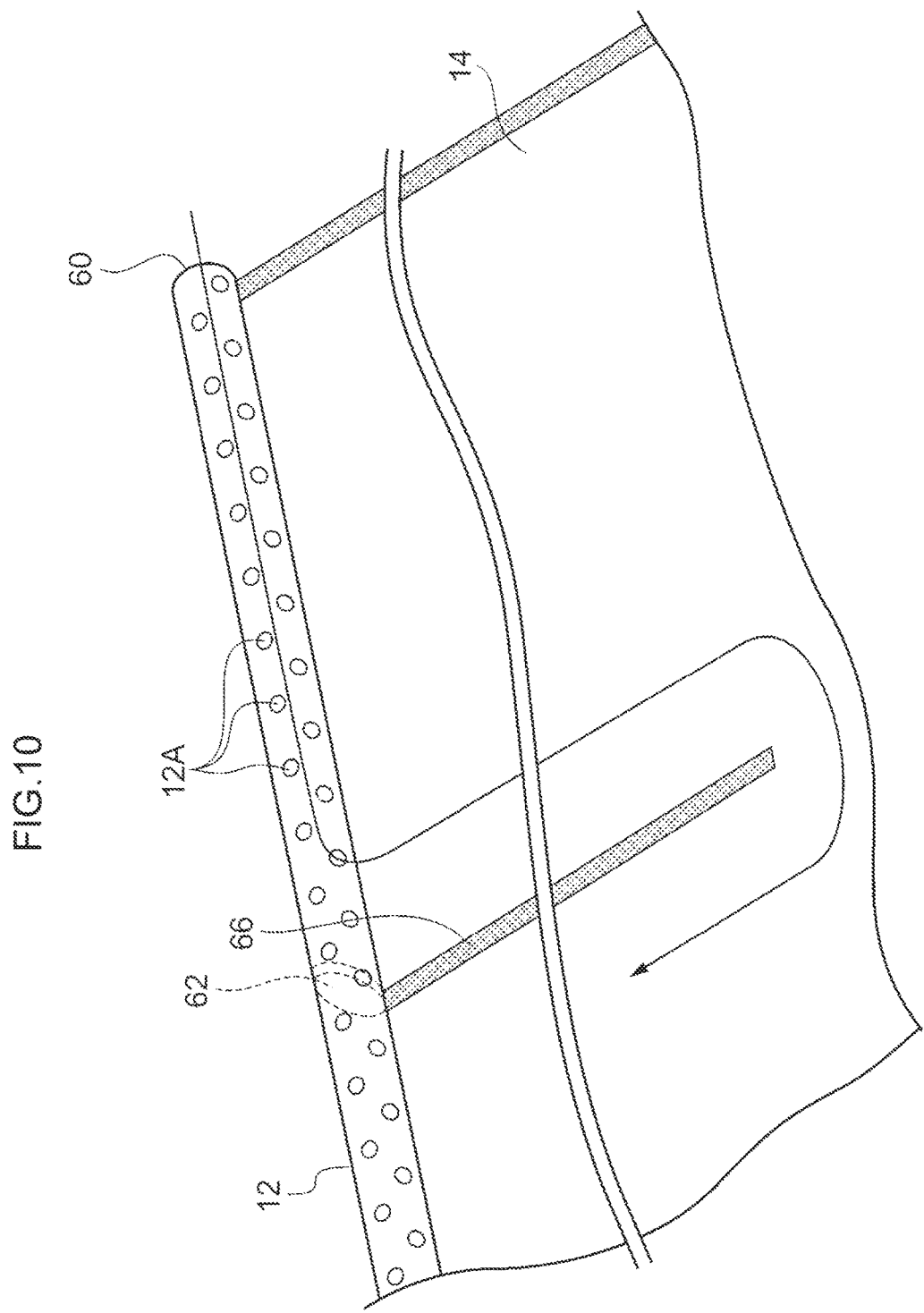
FIG. 10 is a diagram showing a variation example of the acidic gas separation module shown in FIG. 9.

As shown in FIG. 10, the blocking member 62 may be formed diagonally with respect to the direction of the flow of the sweep gas, in order to reduce pressure loss.

Figure 11:
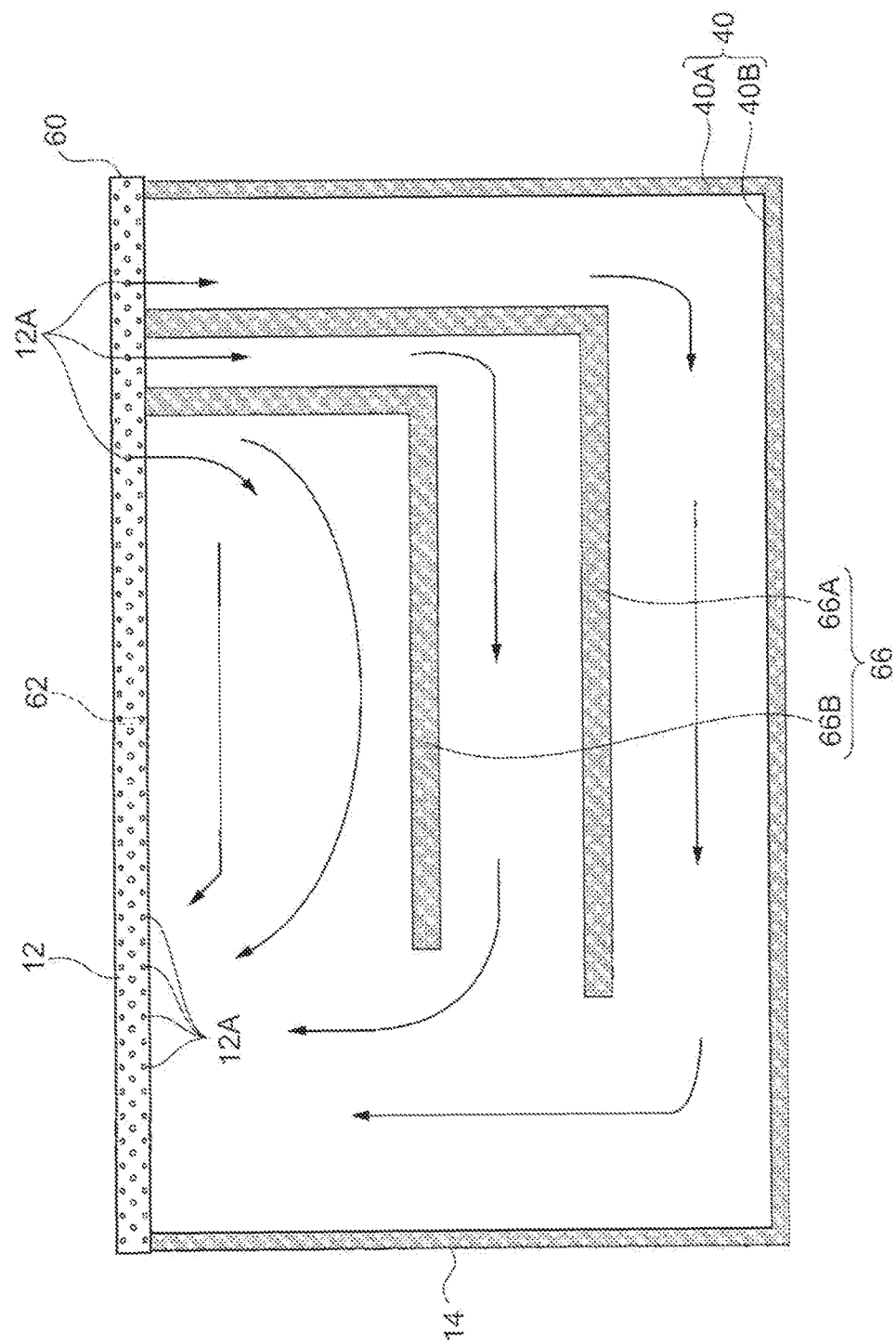
FIG. 11 is a diagram showing another variation example of the acidic gas separation module shown in FIG. 9.

Further, the number or the shape of the partition bonding portion 66 is not particularly limited, and the partition bonding portion 66 may have an almost L-shaped outer side partition bonding portion 66A and an almost L-shaped inner side partition bonding portion 66B, as shown in FIG. 11. The number or the shape of the partition bonding portion 64 is not limited, either.

<Acidic Gas Separation Device>

Figure 12:
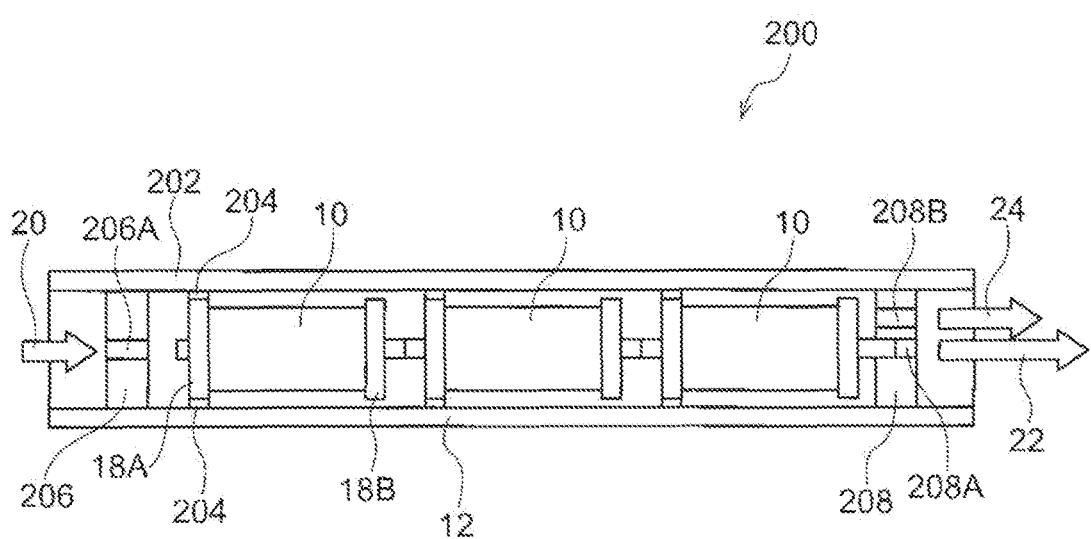
FIG. 12 is a schematic diagram showing one exemplary embodiment of an acidic gas separation device of the invention.

FIG. 12 is a schematic diagram showing one exemplary embodiment of an acidic gas separation device of the invention.

As shown in FIG. 12, the acidic gas separation device 200 according to the exemplary embodiment of the invention is equipped with acidic gas separation modules 10 and a pressure container 202 in which the acidic gas separation modules 10 are loaded.

As the acidic gas separation module 10, the acidic gas separation module according to the exemplary embodiment of the invention (including the variation examples) is used.

However, as shown in FIG. 12, in a case in which the plurality of acidic gas separation modules 10 are loaded, in the state of being connected in series, in the pressure container, it is enough that the acidic gas separation module according to the exemplary embodiment of the invention (including the variation examples) is used as at least one of the plurality of acidic gas separation modules 10.

Specifically, in the acidic gas separation device 200, the plurality of (in FIG. 12, three) acidic gas separation modules 10 are connected in series and loaded in the pressure container 202. Each of the acidic gas separation modules 10 is loaded in the pressure container 202, in the state in which the space between the outer peripheral face of the telescope prevention plate 18 on the side where the source gas 20 is supplied, and the inner wall of the pressure container 202 is sealed with a sealing material 204.

In the pressure container 202, a supply side container end plate 206 provided with a supply port 206A for a source gas 20 is inset in one end portion on the side where the source gas 20 is supplied. Further, in the pressure container 202, a discharge side container end plate 208 provided with an acidic gas discharge port 208A through which the acidic gas is discharged and a residual gas discharge port 208B through which the residual gas 24 is discharged is inset in the other end portion on the side where the acidic gas 22 that has been separated is discharged.

In the acidic gas separation device 200, the source gas 20 flows into the pressure container 202 via the supply port 206A that is formed in the supply side container end plate 206, and is supplied to the acidic gas separation module 10. By the acidic gas separation modules 10, the acidic gas 22 is separated from the source gas 20, and thereafter, the acidic gas 22 that has been separated is discharged via the acidic gas discharge port 208A that is formed in the discharge side container end plate 208, and the residual gas 24 is discharged via the residual gas discharge port 208B.

Note that, the acidic gas separation device 200 is not limited to the above configuration, and may have a form in which one acidic gas separation module 10 is loaded in a pressure container 202, a form in which the plurality of acidic gas separation modules 10 are loaded, in the state of being arranged in parallel, in a pressure container 202, a form in which a plurality of units each including the plurality of acidic gas separation modules 10 connected in series are loaded, in the state of being arranged in parallel, in a pressure container 202, or the like.

Here, in the acidic gas separation device 200, regarding the acidic gas separation module 10 as the n-th module (n is an integer of 2 or more) from the gas supply side, among the plurality of acidic gas separation modules 10 connected in series, when the ratio (D2$n$/D1$n$) of the open area ratio D2$n$ of the telescope prevention plate 18B on the gas discharge side relative to the open area ratio D1$n$ of the telescope prevention plate 18A on the gas supply side is represented by $\Delta(n)$, it is favorable that the relationship of $\Delta(n-1) > \Delta(n)$ is satisfied.

Namely, it is favorable that the acidic gas separation device 200 satisfies the following relationship.

$$\Delta(1)[=(D21/D11)] > \Delta(2)[=(D22/D12)] > \Delta(3)[=(D23/D13)] < \ldots > \Delta(n)[=(D2n/D1n)]$$

Here, the open area ratio D1$n$ and the open area ratio D2$n$ have the same definitions as the above-described gas supply side open area ratio D1 and gas discharge side open area ratio D2, respectively.

In the acidic gas separation device 200, the relationship of $\Delta(n-1) > \Delta(n)$ indicates that the plurality of acidic gas separation modules 10 are connected in series, such that the D2/D1 ratio of the acidic gas separation module 10 gets smaller, sequentially, from the gas supply side toward the gas discharge side.

Thus, the back pressure at the gas discharge side of the acidic gas separation module 10, which is connected to the gas discharge side, gets higher than the back pressure at the gas supply side and, as coming closer to the gas discharge side, a state in which flowing of source gas is facilitated can be formed in the outer periphery side region 188B of the acidic gas separation module 10, even in the state in which the supply pressure of the source gas is lowered, and thus, the outer periphery side region can contribute to the separation of acidic gas.

Accordingly, by satisfying the relationship of $\Delta(n-1) > \Delta(n)$, the acidic gas separation device 200 can improve the gas separation efficiency and can reduce the pressure loss.

Note that, the acidic gas separation device 200 can improve the gas separation efficiency and can reduce the pressure loss, as far as the relationship of $\Delta(n-1) > \Delta(n)$ is satisfied, even if the D2/D1 ratio of each of the acidic gas separation modules 10 does not satisfy the above range. However, from the viewpoints of improving the gas separation efficiency and reducing the pressure loss, it is favorable that the D2/D1 ratio of at least one acidic gas separation module 10 of the plurality of acidic gas separation modules satisfies the above range, and further, the relationship of $\Delta(n-1) > \Delta(n)$ is satisfied.

Further, the D2/D1 ratio of acidic gas separation module 10 that is connected as the n-th or any later (the second or any later, or the third or any later) module from the gas supply side may be set so as to satisfy the above range.

In the above, the present invention is explained in detail by way of specific exemplary embodiments; however, the invention is not limited to these exemplary embodiments, and it is apparent to those skilled in the art that various other exemplary embodiments are possible within the range of the invention.

EXAMPLES

Hereinafter, the present invention is described in more detail in accordance with Examples; however, it should be construed that the invention is by no means limited to these Examples.

Example 1

To an aqueous solution containing 2.4% by weight of KURASTMER AP-20 (trade name, manufactured by Kuraray Co., Ltd.) as a polyvinyl alcohol-polyacrylic acid copolymer and 0.01% by weight of a 25% aqueous solution of glutaraldehyde (manufactured by Wako Pure Chemical Industries, Ltd.), 1 M hydrochloric acid was added until the pH reached 1. After completion of thickening reaction, a 40% aqueous solution of cesium carbonate (manufactured by Kisan Kinzoku Chemicals Co, Ltd.), which serves as a carrier, was added thereto such that the concentration of cesium carbonate was 6.0% by weight. Further, 1% RAPISOL A-90 [trade name, manufactured by NOF Corporation; a surfactant represented by the following structural formula (di(2-ethylhexyl) sulfosuccinate sodium salt, molecular weight=445; specific compound)] was added thereto, such that the content was 0.003% by weight. After elevating the temperature, an aqueous solution of agar, which had been separately prepared, was added thereto, to obtain coating liquid composition 1.

This coating liquid composition 1 was coated on a PTFE/PP non-woven fabric (manufactured by GE Energy Japan K.K.) as a porous support, followed by drying, to prepare an acidic gas separation layer including an accelerated transport membrane and a porous support.

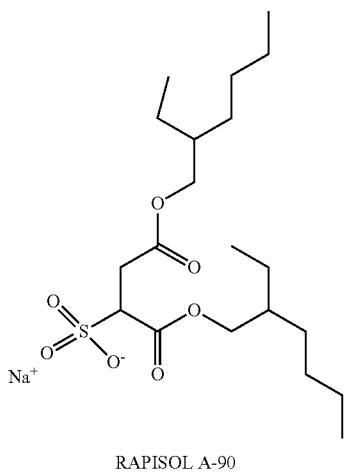 [SMILES: [Na+] ; CCCCC(CC)COC(=O)CC(C(=O)OCC(CC)CCCC)S(=O)(=O)[O-]]

RAPISOL A-90

Subsequently, the acidic gas separation layer thus prepared was folded in two, in such a manner that the accelerated transport membrane was on the inward side. KAPTON (registered trademark) tape was adhered to the volley fold part of the membrane folded in two, to reinforce the membrane such that the end portion of the supply gas flow channel member did not injure the surface state of the volley fold part of the membrane. Then, as the supply gas flow channel member, a net made of polypropylene and having a thickness of 0.5 mm was put between the two-folded acidic gas separation layer. An adhesive agent (trade name: E120HP, manufactured by Henkel Japan Ltd.) made of a high-viscosity (about 40 Pa·s) epoxy resin was applied onto the porous support side of this unit, such that an envelope shape was formed (see, FIG. 7). Then, a permeating gas flow channel member made of a tricot knitted epoxy-impregnated polyester was superposed. The resulting assembly was wound in multiple layers around the permeating gas collecting tube.

Thereafter, a gas supply side telescope prevention plate, which is made of SUS and has a shape of Pattern 1 (the shape shown in FIG. 3), an S1/S2 ratio of 0.88, and a gas supply side open area ratio D1 of 89%, was mounted to the end face of the obtained structure on the gas supply side, and FPR resin tape was wound around the connecting part, to perform sealing.

Further, a gas discharge side telescope prevention plate, which is made of SUS and has a shape of Pattern 1 (the shape shown in FIG. 3), an S1/S2 ratio of 0.85, and a gas discharge side open area ratio D2 of 85%, was mounted to the other end face of the obtained structure on the gas discharge side, and FPR resin tape was wound around the connecting part, to perform sealing.

By going through the processes described above, Sample 1 of acidic gas separation module having a diameter of 8 cm and a width of 20 cm, in Example 1, was prepared.

Further, preparation of Samples 2 to 8 was conducted in a manner substantially similar to that in the preparation of Sample 1, except that the conditions were changed to the conditions shown in Table 1.

It should be noted that, regarding the telescope prevention plates applied to the samples, the patterns according to Table 1 (Patterns 1 and 2) were deemed as the standard shapes, and telescope prevention plates in which the S1/S2 ratio and the gas supply side open area ratio D1 or the gas discharge side open area ratio D2 had been adjusted so as to be the values according to Table 1 were applied.

Example 2

Three pieces of a sample of acidic gas separation module were prepared in a manner substantially similar to that in the preparation of Sample 1 in Example 1, except that the conditions were changed to the conditions according to Table 2. These three pieces were connected in series. Thereby, Sample Units 1 to 6 of acidic gas separation module in Example 2 were obtained.

Note that, in Table 2, "the first piece to the third piece" indicates the order of the acidic gas separation modules, which are connected in series, from the gas supply side. Namely, the sample unit is loaded in a pressure container such that the first piece of acidic gas separation module is disposed at the place closest to the gas supply side, and the third piece of acidic gas separation module is disposed at the place closest to the gas supply side.

Example 3

Preparation of Samples 1 to 4 of acidic gas separation module in Example 3 was conducted in a manner substantially similar to that in the preparation of Sample 1 in Example 1, except that the permeating gas collecting tube was changed to a permeating gas collecting tube having a blocking member at the central part of the tube, a partition bonding portion (see FIG. 9) was formed to apply a flow path, through which the sweep gas flows, and the conditions were changed to the conditions according to Table 1.

Example 4

Three pieces of a sample of acidic gas separation module were prepared in a manner substantially similar to that in the preparation of Sample 1 in Example 1, except that the permeating gas collecting tube was changed to a permeating gas collecting tube having a blocking member at the central part of the tube, a partition bonding portion (see FIG. 9) was formed to apply a flow path, through which the sweep gas flows, and the conditions were changed to the conditions according to Table 2. These three pieces were connected in series. Thereby, Sample Units 1 to 5 of acidic gas separation module in Example 4 were obtained.

Example 5

Water was added to KURASTMER AP-22 (trade name, manufactured by Kuraray Co., Ltd.), as a polyvinyl alcohol-polyacrylic acid copolymer, while stirring, and then an aqueous solution of cesium carbonate (solids concentration: 40% by mass) was added thereto. The mixture was thoroughly stirred under the condition of a temperature of 25° C., to prepare an aqueous solution, in which the mass ratio of the polyvinyl alcohol-polyacrylic acid copolymer to the cesium carbonate was 1:2, and the solids concentration in the liquid was 26%. Then, degassing was performed, to obtain coating liquid composition 2.

Preparation of Samples 1 to 4 of acidic gas separation module in Example 5 was conducted in a manner substantially similar to that in the preparation of Sample 1 in Example 1, except that the coating liquid composition 2 was used instead of using the coating liquid composition 1, and the conditions were changed to the conditions according to Table 1.

Example 6

Three pieces of a sample of acidic gas separation module were prepared in a manner substantially similar to that in the preparation of Sample 1 in Example 1, except that the coating liquid composition 2 was used instead of using the coating liquid composition 1, and the conditions were changed to the conditions according to Table 2. These three pieces were connected in series. Thereby, Sample Units 1 to 5 of acidic gas separation module in Example 6 were obtained.

<Evaluation of Gas Separation>

The sample or the sample unit of acidic gas separation module prepared in the respective examples was loaded in a pressure container, and evaluation in regard to the performance for separation of acidic gas was performed. The methods for evaluation on the performance for separation of acidic gas are as follows.

However, with regard to Examples 1, 3, and 5, evaluation was performed according to Evaluation 1, and with regard to Examples 2, 4, and 6, evaluation was performed according to Evaluation 2.

—Evaluation 1 on Performance for Separation of Acidic Gas (Examples 1, 3, and 5)—

As the test gas, a source gas of $H_2:CO_2:H_2O=45:5:50$ (flow rate: 44 L/min) was supplied at a temperature of 130° C., and a total pressure of 301.3 kPa, to each of the samples of acidic gas separation module, and a mixed gas of $H_2O:Ar=50:50$ (flow rate: 12 L/min) was made to flow on the permeation side. The gas that had permeated was analyzed by gas chromatography, and the $CO_2$ permeation speed ($P(CO_2)$) and the $CO_2/H_2$ separation factor ($\alpha$) were calculated.

—Evaluation 2 on Performance for Separation of Acidic Gas (Examples 2, 4, and 6)—

As the test gas, a source gas of $H_2:CO_2:H_2O=45:5:50$ (flow rate: 132 L/min) was supplied at a temperature of 130° C., and a total pressure of 301.3 kPa, to each of the sample units of acidic gas separation module, and a mixed gas of $H_2O:Ar=50:50$ (flow rate: 36 L/min) was made to flow on the permeation side. The gas that had permeated was analyzed by gas chromatography, and the $CO_2$ permeation speed ($P(CO_2)$) and the $CO_2/H_2$ separation factor ($\alpha$) were calculated.

In the following, the details of each example and evaluation results are summarized in Table 1 and Table 2.

TABLE 1

| | Size of AGSM | | | Telescope Prevention Plate | | | | | Evaluation | | |
| | | | | GS side | | GD side | | | $P(CO_2)$ | | |
| Smp. No. | Diamt. | Width | Shape | S1/S2 | D1 | S1/S2 | D2 | D2/D1 | [mol/m² · s · kPa] | α | Notes |
|---|---|---|---|---|---|---|---|---|---|---|---|
| | | | | | | Example 1 | | | | | |
| 1 | 8 cm. | 20 cm | Pattern1 (shape shown in FIG. 3) | 0.88 | 89% | 0.85 | 85% | 0.95 | $1.6 \times 10^{-5}$ | 100 | Comp. |
| 2 | 8 cm. | 20 cm | Pattern1 (shape shown in FIG. 3) | 0.88 | 89% | 0.67 | 71% | 0.8 | $1.9 \times 10^{-5}$ | 110 | Prent. |
| 3 | 8 cm. | 20 cm | Pattern1 (shape shown in FIG. 3) | 0.88 | 89% | 0.36 | 53% | 0.6 | $2.3 \times 10^{-5}$ | 113 | Prent. |
| 4 | 8 cm. | 20 cm | Pattern1 (shape shown in FIG. 3) | 0.88 | 89% | 0.03 | 40% | 0.45 | $1.4 \times 10^{-5}$ | 98 | Comp. |
| 5 | 8 cm. | 20 cm | Pattern2 (shape shown in FIG. 5) | 0.75 | 77% | 0.69 | 73% | 0.95 | $1.9 \times 10^{-5}$ | 115 | Comp. |
| 6 | 8 cm. | 20 cm | Pattern2 (shape shown in FIG. 5) | 0.75 | 77% | 0.51 | 62% | 0.8 | $2.3 \times 10^{-5}$ | 120 | Prent. |
| 7 | 8 cm. | 20 cm | Pattern2 (shape shown in FIG. 5) | 0.75 | 77% | 0.21 | 46% | 0.6 | $2.5 \times 10^{-5}$ | 123 | Prent. |
| 8 | 8 cm. | 20 cm | Pattern2 (shape shown in FIG. 5) | 0.75 | 77% | 0 | 35% | 0.45 | $1.8 \times 10^{-5}$ | 112 | Comp. |
| | | | | | | Example 3 | | | | | |
| 1 | 8 cm. | 20 cm | Pattern2 (shape shown in FIG. 5) | 0.75 | 77% | 0.69 | 73% | 0.95 | $2.3 \times 10^{-5}$ | 120 | Comp. |
| 2 | 8 cm. | 20 cm | Pattern2 (shape shown in FIG. 5) | 0.75 | 77% | 0.51 | 62% | 0.8 | $2.5 \times 10^{-5}$ | 125 | Prent. |
| 3 | 8 cm. | 20 cm | Pattern2 (shape shown in FIG. 5) | 0.75 | 77% | 0.21 | 46% | 0.6 | $2.8 \times 10^{-5}$ | 132 | Prent. |
| 4 | 8 cm. | 20 cm | Pattern2 (shape shown in FIG. 5) | 0.75 | 77% | 0 | 35% | 0.45 | $2.0 \times 10^{-5}$ | 117 | Comp. |
| | | | | | | Example 5 | | | | | |
| 1 | 8 cm. | 20 cm | Pattern1 (shape shown in FIG. 3) | 0.88 | 89% | 0.85 | 85% | 0.95 | $1.7 \times 10^{-5}$ | 103 | Comp. |
| 2 | 8 cm. | 20 cm | Pattern1 (shape shown in FIG. 3) | 0.88 | 89% | 0.67 | 71% | 0.8 | $2.1 \times 10^{-5}$ | 114 | Prent. |
| 3 | 8 cm. | 20 cm | Pattern1 (shape shown in FIG. 3) | 0.88 | 89% | 0.36 | 53% | 0.6 | $2.4 \times 10^{-5}$ | 111 | Prent. |
| 4 | 8 cm. | 20 cm | Pattern1 (shape shown in FIG. 3) | 0.88 | 89% | 0.03 | 40% | 0.45 | $1.3 \times 10^{-5}$ | 96 | Comp. |

TABLE 2

| | | Telescope Prevention Plate | | | | | | | | |
| | | 1st Piece | | | | | 2nd Piece | | | |
| | | GS side | | GD side | | | GS side | | GD side | |
| Smp. No. | Shape | S1/S2 | D1 | S1/S2 | D2 | D2/D1 | S1/S2 | D1 | S1/S2 | D2 | D2/D1 |
|---|---|---|---|---|---|---|---|---|---|---|---|
| | | | | | Example 2 | | | | | | |
| 1 | Pattern1 | 0.88 | 89% | 0.88 | 89% | 1 | 0.88 | 89% | 0.88 | 89% | 1 |
| 2 | Pattern1 | 0.88 | 89% | 0.88 | 89% | 1 | 0.85 | 86% | 0.88 | 89% | 1.04 |

TABLE 2-continued

| | | | | | | | | | | |
|---|---|---|---|---|---|---|---|---|---|---|
| 3 | Pattern1 | 0.88 | 89% | 0.88 | 89% | 1 | 0.88 | 89% | 0.85 | 86% | 0.97 |
| 4 | Pattern2 | 0.75 | 77% | 0.75 | 77% | 1 | 0.75 | 77% | 0.69 | 72% | 0.93 |
| 5 | Pattern2 | 0.75 | 77% | 0.75 | 77% | 1 | 0.75 | 77% | 0.7 | 67% | 0.87 |
| 6 | Pattern2 | 0.75 | 77% | 0.7 | 67% | 0.87 | 0.75 | 77% | 0.37 | 54% | 0.70 |

Example 4

| 1 | Pattern1 | 0.88 | 89% | 0.88 | 89% | 1 | 0.88 | 89% | 0.88 | 89% | 1 |
|---|---|---|---|---|---|---|---|---|---|---|---|
| 2 | Pattern1 | 0.88 | 89% | 0.88 | 89% | 1 | 0.88 | 89% | 0.85 | 86% | 0.97 |
| 3 | Pattern2 | 0.75 | 77% | 0.75 | 77% | 1 | 0.75 | 77% | 0.69 | 72% | 0.93 |
| 4 | Pattern2 | 0.75 | 77% | 0.75 | 77% | 1 | 0.75 | 77% | 0.7 | 67% | 0.87 |
| 5 | Pattern2 | 0.75 | 77% | 0.7 | 67% | 0.87 | 0.75 | 77% | 0.37 | 54% | 0.70 |

Example 6

| 1 | Pattern1 | 0.88 | 89% | 0.88 | 89% | 1 | 0.88 | 89% | 0.88 | 89% | 1 |
|---|---|---|---|---|---|---|---|---|---|---|---|
| 2 | Pattern1 | 0.88 | 89% | 0.88 | 89% | 1 | 0.88 | 89% | 0.85 | 86% | 0.97 |
| 3 | Pattern2 | 0.75 | 77% | 0.75 | 77% | 1 | 0.75 | 77% | 0.69 | 72% | 0.93 |
| 4 | Pattern2 | 0.75 | 77% | 0.75 | 77% | 1 | 0.75 | 77% | 0.7 | 67% | 0.87 |
| 5 | Pattern2 | 0.75 | 77% | 0.7 | 67% | 0.87 | 0.75 | 77% | 0.37 | 54% | 0.70 |

| | Telescope Prevention Plate 3rd Piece | | | | Evaluation | | |
|---|---|---|---|---|---|---|---|
| | GS side | | GD side | | $P(CO_2)$ | | |
| Smp. No. | S1/S2 | D1 | S1/S2 | D2 | D2/D1 | [mol/m² · s · kPa] | α | Notes |

Example 2

| 1 | 0.88 | 89% | 0.88 | 89% | 1 | $1.2 \times 10^{-5}$ | 85 | Comp. |
|---|---|---|---|---|---|---|---|---|
| 2 | 0.83 | 84% | 0.88 | 89% | 1.06 | $0.9 \times 10^{-5}$ | 75 | Comp. |
| 3 | 0.88 | 89% | 0.83 | 84% | 0.94 | $1.5 \times 10^{-5}$ | 100 | Prent. |
| 4 | 0.75 | 77% | 0.7 | 67% | 0.87 | $2.0 \times 10^{-5}$ | 110 | Prent. |
| 5 | 0.75 | 77% | 0.1 | 41% | 0.53 | $1.7 \times 10^{-5}$ | 106 | Prent. |
| 6 | 0.75 | 77% | 0.1 | 41% | 0.53 | $2.2 \times 10^{-5}$ | 115 | Prent. |

Example 4

| 1 | 0.88 | 89% | 0.88 | 89% | 1 | $1.4 \times 10^{-5}$ | 95 | Comp. |
|---|---|---|---|---|---|---|---|---|
| 2 | 0.88 | 89% | 0.83 | 84% | 0.94 | $1.7 \times 10^{-5}$ | 100 | Prent. |
| 3 | 0.75 | 77% | 0.7 | 67% | 0.87 | $2.3 \times 10^{-5}$ | 115 | Prent. |
| 4 | 0.75 | 77% | 0.1 | 41% | 0.53 | $1.9 \times 10^{-5}$ | 108 | Prent. |
| 5 | 0.75 | 77% | 0.1 | 41% | 0.53 | $2.3 \times 10^{-5}$ | 120 | Prent. |

Example 6

| 1 | 0.88 | 89% | 0.88 | 89% | 1 | $1.3 \times 10^{-5}$ | 94 | Comp. |
|---|---|---|---|---|---|---|---|---|
| 2 | 0.88 | 89% | 0.83 | 84% | 0.94 | $1.8 \times 10^{-5}$ | 102 | Prent. |
| 3 | 0.75 | 77% | 0.7 | 67% | 0.87 | $2.5 \times 10^{-5}$ | 120 | Prent. |
| 4 | 0.75 | 77% | 0.1 | 41% | 0.53 | $2.1 \times 10^{-5}$ | 111 | Prent. |
| 5 | 0.75 | 77% | 0.1 | 41% | 0.53 | $2.4 \times 10^{-5}$ | 122 | Prent. |

In tables 1 and 2, the abbreviation "Smp. No." represents "Sample Number", the abbreviation "AGSM" represents "Acidic Gas Separation Module", the abbreviation "Diamt." represents "Diameter", the abbreviation "GS side" represents "Gas Supply side", the abbreviation "GD side" represents "Gas Discharge side", the abbreviation "Comp." represents "Comparative Example", and the abbreviation "Prent." represents "Present Invention".

As shown in Table 1 and Table 2, it is understood that results showing that both a high $CO_2$ permeation speed ($P(CO_2)$) and a high $CO_2/H_2$ separation factor (a) are achieved were obtained, in the samples and sample units of acidic gas separation module according to the invention.

From the above results, it is understood that the invention can improve the gas separation efficiency of acidic gas separation module and can reduce the pressure loss.

Test Example 1

To an aqueous solution containing 2.4% by weight of KURASTMER AP-20 (trade name, manufactured by Kuraray Co., Ltd.), as a polyvinyl alcohol-polyacrylic acid copolymer, and 0.01% by weight of a 25% aqueous solution of glutaraldehyde (manufactured by Wako Pure Chemical Industries, Ltd.), 1 M hydrochloric acid was added until the pH reached 1. After completion of thickening reaction, a 40% aqueous solution of cesium carbonate (manufactured by Kisan Kinzoku Chemicals Co, Ltd.), which serves as a carrier, was added thereto such that the concentration of cesium carbonate was 6.0% by weight. Further, 1% RAPISOL A-90 [trade name, manufactured by NOF Corporation; a surfactant represented by the following structural formula (di(2-ethylhexyl) sulfosuccinate sodium salt, molecular weight=445; specific compound)] was added thereto such that the content was 0.003% by weight. After elevating the temperature, an aqueous solution of agar, which had been separately prepared, was added thereto, to obtain coating liquid composition 1.

This coating liquid composition 1 was coated on a PTFE/PP non-woven fabric (manufactured by GE Energy Japan K.K.) as a porous support, followed by drying, to prepare an acidic gas separation layer including an accelerated transport membrane and a porous support.

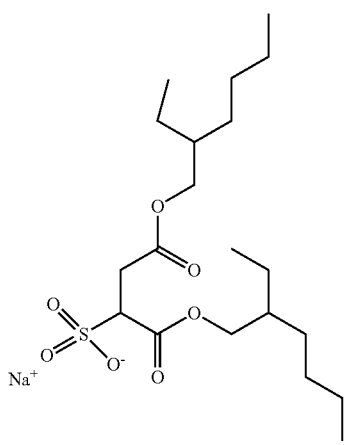

RAPISOL A-90

Subsequently, the acidic gas separation layer thus prepared was folded in two, in such a manner that the accelerated transport membrane was on the inward side. KAPTON (registered trademark) tape was adhered to the volley fold part of the membrane folded in two, to reinforce the membrane such that the end portion of the supply gas flow channel member did not injure the surface state of the volley fold part of the membrane. Then, as the supply gas flow channel member, a net made of polypropylene and having a thickness of 0.5 mm was put between the two-folded acidic gas separation layer. An adhesive agent (trade name: E120HP, manufactured by Henkel Japan Ltd.) made of a high-viscosity (about 40 Pa·s) epoxy resin was applied onto the porous support side of this unit such that an envelope shape was formed (see FIG. 7). Then, a permeating gas flow channel member made of a tricot knitted epoxy-impregnated polyester was superposed. The resulting assembly was wound in multiple layers around the permeating gas collecting tube.

Thereafter, telescope prevention plates, each of which is made of SUS and has a shape of Pattern 1 (the shape shown in FIG. 2), an inner periphery side open area ratio S1 of 70%, an outer periphery side open area ratio S2 of 85%, and an S1/S2 ratio of 0.82, were mounted to both end faces of the obtained structure, respectively, and FPR resin tape was wound around the connecting parts, to perform sealing.

By going through the processes described above, Sample 1 of acidic gas separation module having a diameter of 4 cm and a width of 30 cm, in Test Example 1, was prepared.

Further, preparation of Samples 2 to 17 was conducted in a manner substantially similar to that in the preparation of Sample 1, except that the conditions were changed to the conditions shown in Table 3.

It should be noted that, regarding the telescope prevention plates applied to the samples, the patterns according to Table 3 (Patterns 1 to 4) were deemed as the standard shapes, and telescope prevention plates in which the inner periphery side open area ratio S1, the outer periphery side open area ratio S2, and the S1/S2 ratio had been adjusted so as to be the values according to Table 3 were applied.

Test Example 2

Preparation of Samples 1 to 4 of acidic gas separation module in Test Example 2 was conducted in a manner substantially similar to that in the preparation of Sample 1 in Test Example 1, except that the permeating gas collecting tube was changed to a permeating gas collecting tube having a blocking member at the central part of the tube, a partition bonding portion (see FIG. 9) was formed to apply a flow path, through which the sweep gas flows, and the conditions were changed to the conditions according to Table 4.

Test Example 3

Water was added to KURASTMER AP-22 (trade name, manufactured by Kuraray Co., Ltd.), as a polyvinyl alcohol-polyacrylic acid copolymer, while stirring, and then an aqueous solution of cesium carbonate (solids concentration: 40% by mass) was added thereto. The mixture was thoroughly stirred under the condition of a temperature of 25° C., to prepare an aqueous solution, in which the mass ratio of the polyvinyl alcohol-polyacrylic acid copolymer to the cesium carbonate was 1:2, and the solids concentration in the liquid was 26%. Then, degassing was performed, to obtain coating liquid composition 2.

Preparation of Samples 1 to 4 of acidic gas separation module in Test Example 3 was conducted in a manner substantially similar to that in the preparation of Sample 1 in Test Example 1, except that the coating liquid composition 2 was used instead of using the coating liquid composition 1, and the conditions were changed to the conditions according to Table 5.

<Evaluation of Gas Separation>

The sample of acidic gas separation module prepared in the respective examples was loaded in a pressure container, and evaluation in regard to the performance for separation of acidic gas was performed. The method for evaluation on the performance for separation of acidic gas is as follows.

—Evaluation on Performance for Separation of Acidic Gas—

As the test gas, a source gas of $H_2:CO_2:H_2O=45:5:50$ (flow rate: 44 L/min) was supplied under the conditions of a temperature of 130° C. and a total pressure of 301.3 kPa, to each of the samples of acidic gas separation module, and a mixed gas of $H_2O:Ar=50:50$ (flow rate: 12 L/min) was made to flow on the permeation side. The gas that had permeated was analyzed by gas chromatography, and the $CO_2$ permeation speed ($P(CO_2)$) and the $CO_2/H_2$ separation factor (a) were calculated.

In the following, the details of each test example and evaluation results are summarized in Table 3 to Table 5.

TABLE 3

| | | | Test Example 1 | | | | | | |
|---|---|---|---|---|---|---|---|---|---|
| Smp. No. | Size of AGSM | | Telescope Prevention Plate | | | | Evaluation | | |
| | | | | | | | $P(CO_2)$ | | |
| | Diamt. | Width | Shape | S1 | S2 | S1/S2 | [mol/m² · s · kPa] | α | Notes |
| 1 | 4 cm. | 30 cm | Pattern1 (shape shown in FIG. 2) | 70% | 85% | 0.82 | $1.6 \times 10^{-5}$ | 100 | Ref. |
| 2 | 8 cm. | 20 cm | Pattern1 (shape shown in FIG. 2) | 80% | 90% | 0.88 | $1.3 \times 10^{-5}$ | 95 | Ref. |

TABLE 3-continued

Test Example 1

| Smp. No. | Size of AGSM Diamt. | Width | Telescope Prevention Plate Shape | S1 | S2 | S1/S2 | Evaluation P(CO$_2$) [mol/m$^2$ · s · kPa] | α | Notes |
|---|---|---|---|---|---|---|---|---|---|
| 4 | 4 cm. | 30 cm | Pattern2 (shape shown in FIG. 3) | 60% | 80% | 0.75 | $2.0 \times 10^{-5}$ | 110 | Prent. |
| 5 | 8 cm. | 20 cm | Pattern2 (shape shown in FIG. 3) | 60% | 80% | 0.75 | $1.9 \times 10^{-5}$ | 115 | Prent. |
| 6 | 12 cm. | 10 cm | Pattern2 (shape shown in FIG. 3) | 60% | 80% | 0.75 | $1.8 \times 10^{-5}$ | 115 | Prent. |
| 7 | 4 cm. | 30 cm | Pattern3 (shape shown in FIG. 4) | 45% | 75% | 0.6 | $2.2 \times 10^{-5}$ | 115 | Prent. |
| 8 | 8 cm. | 20 cm | Pattern3 (shape shown in FIG. 4) | 45% | 75% | 0.6 | $2.0 \times 10^{-5}$ | 120 | Prent. |
| 9 | 12 cm. | 10 cm | Pattern3 (shape shown in FIG. 4) | 45% | 75% | 0.6 | $2.0 \times 10^{-5}$ | 120 | Prent. |
| 10 | 8 cm. | 20 cm | Pattern4 (shape shown in FIG. 5) | 70% | 85% | 0.8 | $1.6 \times 10^{-5}$ | 108 | Prent. |
| 11 | 8 cm. | 20 cm | Pattern4 (shape shown in FIG. 5) | 45% | 75% | 0.6 | $2.1 \times 10^{-5}$ | 120 | Prent. |
| 12 | 4 cm. | 30 cm | Pattern4 (shape shown in FIG. 5) | 30% | 65% | 0.45 | $1.9 \times 10^{-5}$ | 105 | Prent. |
| 13 | 8 cm. | 20 cm | Pattern4 (shape shown in FIG. 5) | 30% | 65% | 0.45 | $1.7 \times 10^{-5}$ | 110 | Prent. |
| 14 | 12 cm. | 10 cm | Pattern4 (shape shown in FIG. 5) | 30% | 65% | 0.45 | $1.7 \times 10^{-5}$ | 110 | Prent. |
| 15 | 8 cm. | 20 cm | Pattern4 (shape shown in FIG. 5) | 15% | 60% | 0.25 | $1.6 \times 10^{-5}$ | 108 | Prent. |
| 16 | 8 cm. | 20 cm | Pattern4 (shape shown in FIG. 5) | 15% | 60% | 0.2 | $1.5 \times 10^{-5}$ | 105 | Prent. |
| 17 | 8 cm. | 20 cm | Pattern4 (shape shown in FIG. 5) | 10% | 60% | 0.15 | $0.8 \times 10^{-5}$ | 85 | Ref. |

TABLE 4

Test Example 2

| Smp. No. | Size of AGSM Diamt. | Width | Telescope Prevention Plate Shape | S1 | S2 | S1/S2 | Evaluation P(CO$_2$) [mol/m$^2$ · s · kPa] | α | Notes |
|---|---|---|---|---|---|---|---|---|---|
| 1 | 8 cm. | 20 cm | Pattern1 (shape shown in FIG. 2) | 80% | 90% | 0.88 | $1.6 \times 10^{-5}$ | 100 | Ref. |
| 2 | 8 cm. | 20 cm | Pattern2 (shape shown in FIG. 3) | 60% | 80% | 0.75 | $2.3 \times 10^{-5}$ | 120 | Prent. |
| 3 | 8 cm. | 20 cm | Pattern3 (shape shown in FIG. 4) | 45% | 75% | 0.6 | $2.6 \times 10^{-5}$ | 130 | Prent. |
| 4 | 8 cm. | 20 cm | Pattern4 (shape shown in FIG. 5) | 30% | 65% | 0.45 | $2.1 \times 10^{-5}$ | 120 | Prent. |

TABLE 5

Test Example 3

| Smp. No. | Size of AGSM Diamt. | Width | Telescope Prevention Plate Shape | S1 | S2 | S1/S2 | Evaluation P(CO$_2$) [mol/m$^2$ · s · kPa] | α | Notes |
|---|---|---|---|---|---|---|---|---|---|
| 1 | 8 cm. | 20 cm | Pattern1 (shape shown in FIG. 2) | 80% | 90% | 0.88 | $1.7 \times 10^{-5}$ | 105 | Ref. |
| 2 | 8 cm. | 20 cm | Pattern2 (shape shown in FIG. 3) | 60% | 80% | 0.75 | $2.4 \times 10^{-5}$ | 123 | Prent. |
| 3 | 8 cm. | 20 cm | Pattern3 (shape shown in FIG. 4) | 45% | 75% | 0.6 | $2.6 \times 10^{-5}$ | 130 | Prent. |
| 4 | 8 cm. | 20 cm | Pattern4 (shape shown in FIG. 5) | 30% | 65% | 0.45 | $2.2 \times 10^{-5}$ | 121 | Prent. |

In tables 3 to 5, the abbreviation "Smp. No." represents "Sample Number", the abbreviation "AGSM" represents "Acidic Gas Separation Module", the abbreviation "Diamt." represents "Diameter", the abbreviation "Ref." represents "Reference Example", and the abbreviation "Prent." represents "Present Invention".

As shown in Table 3 to Table 5, it is understood that results showing that both a high CO$_2$ permeation speed (P(CO$_2$)) and a high CO$_2$/H$_2$ separation factor (α) are achieved were obtained, in the samples of acidic gas separation module according to the invention.

From the above results, it is understood that the telescope prevention plates according to invention can improve the gas separation efficiency of acidic gas separation module and can reduce the pressure loss.

The foregoing description of the exemplary embodiments of the present invention has been provided for the purposes of illustration and description. It is not intended to be exhaustive or to limit the invention to the precise forms disclosed. The embodiments were chosen and described in order to best explain the principles of the invention and its practical applications, thereby enabling others skilled in the art to understand the invention for various embodiments and with the various modifications as are suited to the particular use contemplated.

Japanese Patent Application Nos. 2012-217831 filed Sep. 28, 2012, 2012-217833 filed Sep. 28, 2012, and 2013-062657 filed Mar. 25, 2013, are hereby expressly incorporated by reference, in its entirety, into the present application. All publications, patent applications, and technical standards mentioned in this specification are herein incorporated by reference to the same extent as if such individual publication, patent application, or technical standard was specifically and individually indicated to be incorporated by reference. It will be obvious to those having skill in the art that many changes may be made in the above-described details of the preferred embodiments of the present invention. It is intended that the scope of the invention be defined by the following claims and their equivalents.

What is claimed is:

1. An acidic gas separation module, comprising:
a permeating gas collecting tube having a tube wall in which through holes are formed;
a layered body that has at least an acidic gas separation layer and that is wound onto the permeating gas collecting tube; and
telescope prevention plates provided at both end faces in an axial direction of the wound layered body,
wherein a ratio (D2/D1) of an open area ratio D2 of a telescope prevention plate on a gas discharge side relative to an open area ratio D1 of a telescope prevention plate on a gas supply side is from 0.5 to 0.9.

2. The acidic gas separation module according to claim 1, wherein the layered body is a layered body formed by layering: a supply gas flow channel member, to which a source gas comprising an acidic gas is supplied; the acidic gas separation layer, which comprises a carrier that reacts with the acidic gas in the source gas that passes through the supply gas flow channel member, and a hydrophilic compound that carries the carrier; and a permeating gas flow channel member, through which the acidic gas that has reacted with the carrier and has permeated through the acidic gas separation layer flows toward the through holes.

3. The acidic gas separation module according to claim 2, wherein the acidic gas separation layer has an accelerated transport membrane that includes the carrier and the hydrophilic compound, which has a crosslinking structure, and a porous support that supports the accelerated transport membrane.

4. The acidic gas separation module according to claim 2, wherein:
the acidic gas separation module is equipped with a bonding portion that bonds end portions in a circumferential direction of the acidic gas separation layer and the permeating gas flow channel member, by bonding both side end portions of the acidic gas separation layer and the permeating gas flow channel member along the circumferential direction, in a state in which the through holes are covered with the permeating gas flow channel member, and the layered body is wound in multiple layers on the permeating gas collecting tube;
the permeating gas collecting tube has: a discharge port which is provided at one end portion of the tube and through which the acidic gas that has been collected from the through holes is discharged; a supply port which is provided at the other end portion of the tube and to which a sweep gas is supplied; and a blocking member which is provided between the discharge port and the supply port and which blocks an interior part of the tube;
a partition bonding portion is formed along the circumferential direction, between circumferential direction bonding portions of the bonding portion that are bonded along the circumferential direction, and on an outer peripheral side of the blocking member; and
the partition bonding portion is not in contact with an axial direction bonding portion of the bonding portion, which bonds the end portions in the circumferential direction, has a narrower width than the circumferential direction bonding portions, and forms a flow path, through which the sweep gas flows, between the circumferential direction bonding portions and the axial direction bonding portion.

5. The acidic gas separation module according to claim 4, wherein the acidic gas separation layer has an accelerated transport membrane that includes the carrier and the hydrophilic compound, which has a crosslinking structure, and a porous support that supports the accelerated transport membrane.

6. The acidic gas separation module according to claim 1, wherein at least one of the telescope prevention plates is equipped with an inner peripheral annular part that forms a central opening, an outer peripheral annular part that is provided at an outer side of the inner peripheral annular part, and a connecting part that connects the inner peripheral annular part and the outer peripheral annular part, and when a planar area excluding the central opening is divided into two regions by a dividing line concentric to the periphery of the outer peripheral annular part such that respective areas of the regions are equal, a ratio (S1/S2) of an open area ratio S1 of a region on the inner peripheral annular part side relative to an open area ratio S2 of a region on the outer peripheral annular part side is from 0.2 to 0.8.

7. The acidic gas separation module according to claim 4, wherein at least one of the telescope prevention plates is equipped with an inner peripheral annular part that forms a central opening, an outer peripheral annular part that is provided at an outer side of the inner peripheral annular part, and a connecting part that connects the inner peripheral annular part and the outer peripheral annular part, and when a planar area excluding the central opening is divided into two regions by a dividing line concentric to the periphery of the outer peripheral annular part such that respective areas of the regions are equal, a ratio (S1/S2) of an open area ratio S1 of a region on the inner peripheral annular part side relative to an open area ratio S2 of a region on the outer peripheral annular part side is from 0.2 to 0.8.

8. The acidic gas separation module according to claim 7, wherein the acidic gas separation layer has an accelerated transport membrane that includes the carrier and the hydrophilic compound, which has a crosslinking structure, and a porous support that supports the accelerated transport membrane.

9. An acidic gas separation device, comprising the acidic gas separation module according to claim 1, and a pressure container in which the acidic gas separation module is loaded.

10. An acidic gas separation device, comprising a plurality of acidic gas separation modules and a pressure container, wherein the plurality of acidic gas separation modules are loaded in the pressure container in a state of being connected in series, and at least one of the plurality of acidic gas separation modules is the acidic gas separation module according to claim 1.

11. An acidic gas separation device, comprising:
a plurality of acidic gas separation modules, each having a permeating gas collecting tube having a tube wall in which through holes are formed, a layered body that has at least an acidic gas separation layer and that is wound on the permeating gas collecting tube, and telescope prevention plates that are provided at both end faces in an axial direction of the wound layered body; and
a pressure container in which the plurality of acidic gas separation modules are loaded in a state of being connected in series, wherein, among the plural acidic gas separation modules, in an acidic gas separation module that is connected in series as an n-th module, where n is an integer of 2 or more, from a gas supply side, when a ratio (D2n/D1n) of an open area ratio D2n of a telescope prevention plate on a gas discharge side relative to an open area ratio D1n of a telescope prevention plate on the gas supply side is represented by $\Delta(n)$, a relationship of $\Delta(n-1) > \Delta(n)$ is satisfied.

12. The acidic gas separation device according to claim 11, wherein, for at least one of the plurality of acidic gas separation modules, a ratio (D2/D1) of an open area ratio D2 of the telescope prevention plate on the gas discharge side relative to an open area ratio D1 of the telescope prevention plate on the gas supply side is from 0.5 to 0.9.

13. The acidic gas separation device according to claim 11, wherein the layered body is a layered body formed by layering: a supply gas flow channel member, to which a source gas comprising an acidic gas is supplied; the acidic gas separation layer, which comprises a carrier that reacts with the acidic gas in the source gas that passes through the supply gas flow channel member, and a hydrophilic compound that carries the carrier; and a permeating gas flow channel member, through which the acidic gas that has reacted with the carrier and has permeated through the acidic gas separation layer flows toward the through holes.

14. The acidic gas separation device according to claim 13, wherein the acidic gas separation layer has an accelerated transport membrane that includes the carrier and the hydrophilic compound, which has a crosslinking structure, and a porous support that supports the accelerated transport membrane.

15. The acidic gas separation device according to claim 13, wherein, for at least one of the plurality of acidic gas separation modules, a ratio (D2/D1) of an open area ratio D2 of the telescope prevention plate on the gas discharge side relative to an open area ratio D1 of the telescope prevention plate on the gas supply side is from 0.5 to 0.9, and the acidic gas separation layer has an accelerated transport membrane that includes the carrier and the hydrophilic compound, which has a crosslinking structure, and a porous support that supports the accelerated transport membrane.

16. The acidic gas separation device according to claim 13, wherein:
the acidic gas separation module is equipped with a bonding portion that bonds end portions in a circumferential direction of the acidic gas separation layer and the permeating gas flow channel member, by bonding both side end portions of the acidic gas separation layer and the permeating gas flow channel member along the circumferential direction, in a state in which the through holes are covered with the permeating gas flow channel member, and the layered body is wound in multiple layers on the permeating gas collecting tube;
the permeating gas collecting tube has: a discharge port which is provided at one end portion of the tube and through which the acidic gas that has been collected from the through holes is discharged; a supply port which is provided at the other end portion of the tube and to which a sweep gas is supplied; and a blocking member which is provided between the discharge port and the supply port and which blocks an interior part of the tube;
a partition bonding portion is formed along the circumferential direction, between circumferential direction bonding portions of the bonding portion that are bonded along the circumferential direction, and on an outer peripheral side of the blocking member; and
the partition bonding portion is not in contact with an axial direction bonding portion of the bonding portion, which bonds the end portions in the circumferential direction, has a narrower width than the circumferential direction bonding portions, and forms a flow path, through which the sweep gas flows, between the circumferential direction bonding portions and the axial direction bonding portion.

17. The acidic gas separation device according to claim 16, wherein, for at least one of the plurality of acidic gas separation modules, a ratio (D2/D1) of an open area ratio D2 of the telescope prevention plate on the gas discharge side relative to an open area ratio D1 of the telescope prevention plate on the gas supply side is from 0.5 to 0.9, and the acidic gas separation layer has an accelerated transport membrane that includes the carrier and the hydrophilic compound, which has a crosslinking structure, and a porous support that supports the accelerated transport membrane.

18. The acidic gas separation device according to claim 11, wherein at least one of the telescope prevention plates is equipped with an inner peripheral annular part that forms a central opening, an outer peripheral annular part that is provided on an outer side of the inner peripheral annular part, and a connecting part that connects the inner peripheral annular part and the outer peripheral annular part, and when a planar area excluding the central opening is divided into two regions by a dividing line concentric to the periphery of the outer peripheral annular part such that respective areas of the regions are equal, a ratio (S1/S2) of an open area ratio S1 of a region on the inner peripheral annular part side relative to an open area ratio S2 of a region on the outer peripheral annular part side is from 0.2 to 0.8.

19. A telescope prevention plate, comprising: an inner peripheral annular part that forms a central opening; an outer peripheral annular part provided on an outer side of the inner peripheral annular part; and a connecting part that connects the inner peripheral annular part and the outer peripheral annular part, wherein, when a planar area excluding the central opening is divided into two regions by a dividing line concentric to the periphery of the outer peripheral annular part such that respective areas of the regions are equal, a ratio (S1/S2) of an open area ratio S1 of a region on the inner peripheral annular part side relative to an open area ratio S2 of a region on the outer peripheral annular part side is from 0.2 to 0.8.

20. The telescope prevention plate according to claim 19, wherein the connecting part comprises a plurality of spoke parts that connect the inner peripheral annular part and the outer peripheral annular part in a radial pattern, in which a width of each of the plurality of spoke parts at the outer peripheral annular part side is smaller than a width of each of the plurality of spoke parts at the inner peripheral annular part side.

21. The telescope prevention plate according to claim 19, wherein the connecting part comprises a plate-like part concentrically extended from the inner peripheral annular part toward an outer side, the plate-like part being provided with a plurality of openings and with spoke parts that connect the plate-like part and the outer peripheral annular part in a radial pattern.

22. The telescope prevention plate according to claim 19, wherein the connecting part comprises a plate-like part that connects the inner peripheral annular part and the outer peripheral annular part, the plate-like part having a plurality of first openings, which are formed in the region on the inner peripheral annular part side, and a plurality of second openings, which are formed in the region on the outer peripheral annular part side, such that an opening area of the second openings is larger than an opening area of the first openings and/or the number of the second openings is larger than the number of the first openings.

23. An acidic gas separation module, comprising:
a permeating gas collecting tube having a tube wall in which through holes are formed;
a layered body that has at least an acidic gas separation layer and that is wound on the permeating gas collecting tube; and
the telescope prevention plates according to claim 19, the telescope prevention plates being provided at both end faces in an axial direction of the wound layered body.

24. An acidic gas separation module, comprising:
a permeating gas collecting tube having a tube wall in which through holes are formed;
a layered body that has at least an acidic gas separation layer and that is wound on the permeating gas collecting tube; and
the telescope prevention plates according to claim 22, the telescope prevention plates being provided at both end faces in an axial direction of the wound layered body.

25. The acidic gas separation module according to claim 23, wherein the layered body is a layered body formed by layering: a supply gas flow channel member, to which a source gas comprising an acidic gas is supplied; the acidic gas separation layer, which comprises a carrier that reacts with the acidic gas in the source gas that passes through the supply gas flow channel member, and a hydrophilic compound that carries the carrier; and a permeating gas flow channel member, through which the acidic gas that has reacted with the carrier and has permeated through the acidic gas separation layer flows toward the through holes.

26. The acidic gas separation module according to claim 25, wherein the acidic gas separation layer has an accelerated transport membrane that includes the carrier and the hydrophilic compound, which has a crosslinking structure, and a porous support that supports the accelerated transport membrane.

27. The acidic gas separation module according to claim 26, wherein the connecting part of the telescope prevention plates comprises a plate-like part that connects the inner peripheral annular part and the outer peripheral annular part, the plate-like part having a plurality of first openings, which are formed in the region on the inner peripheral annular part side, and a plurality of second openings, which are formed in the region on the outer peripheral annular part side, such that an opening area of the second openings is larger than an opening area of the first openings and/or the number of the second openings is larger than the number of the first openings.

28. The acidic gas separation module according to claim 25, wherein:
the acidic gas separation module is equipped with a bonding portion that bonds end portions in a circumferential direction of the acidic gas separation layer and the permeating gas flow channel member, by bonding both side end portions of the acidic gas separation layer and the permeating gas flow channel member along the circumferential direction, in a state in which the through holes are covered with the permeating gas flow channel member, and the layered body is wound in multiple layers on the permeating gas collecting tube;
the permeating gas collecting tube has: a discharge port which is provided at one end portion of the tube and through which the acidic gas that has been collected from the through holes is discharged; a supply port which is provided at the other end portion of the tube and to which a sweep gas is supplied; and a blocking member which is provided between the discharge port and the supply port and which blocks an interior part of the tube;
a partition bonding portion is formed along the circumferential direction, between circumferential direction bonding portions of the bonding portion that are bonded along the circumferential direction, and on an outer peripheral side of the blocking member; and
the partition bonding portion is not in contact with an axial direction bonding portion of the bonding portion, which bonds the end portions in the circumferential direction, has a narrower width than the circumferential direction bonding portions, and forms a flow path, through which the sweep gas flows, between the circumferential direction bonding portions and the axial direction bonding portion.

29. The acidic gas separation module according to claim 28, wherein the connecting part of the telescope prevention plates comprises a plate-like part that connects the inner peripheral annular part and the outer peripheral annular part, the plate-like part having a plurality of first openings, which are formed in the region on the inner peripheral annular part side, and a plurality of second openings, which are formed in the region on the outer peripheral annular part side, such that an opening area of the second openings is larger than an opening area of the first openings and/or the number of the second openings is larger than the number of the first openings.

30. An acidic gas separation device, comprising the acidic gas separation module according to claim 23, and a pressure container in which the acidic gas separation module is loaded.

31. An acidic gas separation device, comprising a plurality of acidic gas separation modules and a pressure container, wherein the plurality of acidic gas separation modules are loaded in the pressure container in a state of being connected in series, and at least one of the plurality of acidic gas separation modules is the acidic gas separation module according to claim 23.

32. An acidic gas separation device, comprising a plurality of acidic gas separation modules and a pressure container, wherein the plurality of acidic gas separation modules are loaded in the pressure container in a state of being connected in series, and at least one of the plurality of acidic gas separation modules is the acidic gas separation module according to claim 29.

* * * * *